United States Patent
Chendamarai Kannan et al.

(10) Patent No.: US 12,256,230 B2
(45) Date of Patent: Mar. 18, 2025

(54) ENHANCED CLEAR CHANNEL ASSESSMENT FOR SHARED RADIO FREQUENCY SPECTRUM BAND

(71) Applicant: QUALCOMM Incorporated, San Diego, CA (US)

(72) Inventors: Arumugam Chendamarai Kannan, San Diego, CA (US); Aleksandar Damnjanovic, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 576 days.

(21) Appl. No.: 17/466,525

(22) Filed: Sep. 3, 2021

(65) Prior Publication Data

US 2021/0400499 A1    Dec. 23, 2021

Related U.S. Application Data

(62) Division of application No. 16/520,107, filed on Jul. 23, 2019, now Pat. No. 11,140,558.

(60) Provisional application No. 62/703,207, filed on Jul. 25, 2018.

(51) Int. Cl.
| | |
|---|---|
| *H04W 4/00* | (2018.01) |
| *H04L 5/00* | (2006.01) |
| *H04W 16/14* | (2009.01) |
| *H04W 72/0446* | (2023.01) |
| *H04W 72/23* | (2023.01) |
| *H04W 74/0808* | (2024.01) |

(52) U.S. Cl.
CPC ........... *H04W 16/14* (2013.01); *H04L 5/0055* (2013.01); *H04W 72/0446* (2013.01); *H04W 72/23* (2023.01); *H04W 74/0808* (2013.01)

(58) Field of Classification Search
CPC . H04W 16/14; H04W 72/23; H04W 72/0446; H04W 74/0808; H04L 5/0055
See application file for complete search history.

(56) References Cited

U.S. PATENT DOCUMENTS

| | | |
|---|---|---|
| 2016/0301509 A1 | 10/2016 | Narasimha et al. |
| 2016/0302226 A1 | 10/2016 | Kim et al. |
| 2017/0041805 A1* | 2/2017 | Chandrasekhar ..... H04L 1/1896 |
| 2017/0195889 A1 | 7/2017 | Takeda et al. |

(Continued)

FOREIGN PATENT DOCUMENTS

CN    106134249 A    11/2016

OTHER PUBLICATIONS

MediaTek Inc. eLAA uplink channel access, May 23-27, 2016, R1-165120 (Year: 2016).*

(Continued)

*Primary Examiner* — Siren Wei
(74) *Attorney, Agent, or Firm* — Arun Swain

(57) ABSTRACT

Methods, systems, and devices for wireless communications are described. A base station may transmit to a user equipment (UE) a control signal comprising a grant for a downlink transmission. The base station may perform, during a gap between the control signal and the downlink transmission, a clear channel assessment (CCA) procedure on a shared radio frequency spectrum band associated with the downlink transmission. The base station may perform, based at least in part on a success of the CCA procedure, the downlink transmission to the UE over the shared radio frequency spectrum band.

22 Claims, 20 Drawing Sheets

(56) References Cited

U.S. PATENT DOCUMENTS

| | | | |
|---|---|---|---|
| 2018/0288805 A1* | 10/2018 | Bhorkar | H04W 74/0816 |
| 2019/0082474 A1 | 3/2019 | Jung et al. | |
| 2019/0090126 A1 | 3/2019 | Hayashi et al. | |
| 2019/0238279 A1* | 8/2019 | Tiirola | H04L 1/1887 |
| 2019/0373635 A1* | 12/2019 | Yang | H04B 7/0408 |
| 2020/0037169 A1 | 1/2020 | Chendamarai Kannan et al. | |

OTHER PUBLICATIONS

CATT: "DL/UL Scheduling for LAA", 3GPP TSG RAN WG1 Meeting #80bis, 3GPP Draft, R1-151360_DL/UL_Scheduling_for_LAA, 3rd Generation Partnership Project (3GPP), Mobile Competence Centre; 650, Route Des Lucioles; F-06921 Sophia-Antipolis Cedex; France, vol. RAN WG1, No. Belgrade, Serbia; Apr. 20-Apr. 24, 2015, Apr. 19, 2015 (Apr. 19, 2015), 4 Pages, Retrieved from the Internet: URL: http://www.3gpp.org/ftp/TSG_RAN/WG1_RL1/TSGR1_80b/Docs/R1-151360.zip [retrieved on Apr. 19, 2015].

Huawei, et al., "UL LBT for LAA", 3GPP TSG RAN WG1 Meeting #82bis, 3GPP Draft, R1-155099, 3rd Generation Partnership Project (3GPP), Mobile Competence Centre, 650, Route Des Lucioles, F-06921 Sophia-Antipolis Cedex, France, vol. RAN WG1, No. Malmo, Sweden, Oct. 5-Oct. 9, 2015, Oct. 4, 2015 (Oct. 4, 2015), XP051002087, Section 2, pp. 1-4. Retrieved from the Internet: URL: http://www.3qpp.org/ftp/Meetings 3GPP SYNC/RAN1/Docs/.

Intel Corporation: "LBT Design and Performance Evaluation for LAA UL", 3GPP Draft; R1-154080 UL LBT-V6, 3rd Generation Partnership Project (3GPP), Mobile Competence Centre, 650, Route Des Lucioles, F-06921 Sophia-Antipolis Cedex, France, vol. RAN WG1, No. Beijing, China; Aug. 24-Aug. 28, 2015 Aug. 23, 2015, XP051039402, Retrieved from the Internet: URL:http://www.3gpp.org/ftp/Meetings_3GPP_SYNC/RAN1/Docs/ [retrieved on Aug. 23, 2015], 5 pages.

International Preliminary Report on Patentability—PCT/US2019/043207, The International Bureau of WIPO—Geneva, Switzerland, Feb. 4, 2021.

International Search Report and Written Opinion—PCT/US2019/043207—ISA/EPO—Sep. 25, 2019.

LG Electronics: "Channel Access Procedure for NR Unlicensed Operation", 3GPP TSG RAN WG1 Meeting #93, 3GPP Draft; R1-1806645, 3rd Generation Partnership Project (3GPP), Mobile Competence Centre, 650, Route Des Lucioles, F-06921 Sophia-Antipolis Cedex, France, vol. RAN WG1, No. Busan, Korea; May 21-May 25, 2018, May 12, 2018, 6 pages, XP051462685, Retrieved from the Internet: URL: http://www.3gpp.org/ftp/tsg%5Fran/WG1%5FRL1/TSGR1%5F93/Docs [retrieved on May 12, 2018] section 2.3, p. 3-p. 5; figure 2.

Mediatek Inc: "eLAA Uplink Channel Access", 3GPP Draft, 3GPP TSG-RAN WG1#85, R1-165120, ELAA Channel Access, 3rd Generation Partnership Project (3GPP), Mobile Competence Centre, 650, Route Des Lucioles, F-06921, Sophia-Antipolis Cedex, France, vol. RAN WG1, Nanjing, China, May 23-May 27, 2016, May 14, 2016 (May 14, 2016), XP051089841, pp. 1-9, Retrieved from the Internet: URL: http://www.3gpp.org/ftp/tsg ran/WG1 RL1/TSGR1 85/Docs/.

* cited by examiner

ENHANCED CLEAR CHANNEL ASSESSMENT FOR SHARED RADIO FREQUENCY SPECTRUM BAND

CROSS REFERENCE

The present Application for Patent is a Divisional of U.S. patent application Ser. No. 16/520,107 by Chendamarai Kannan et al., entitled "ENHANCED CLEAR CHANNEL ASSESSMENT FOR SHARED RADIO FREQUENCY SPECTRUM BAND" filed Jul. 23, 2019, which claims the benefit of U.S. Provisional Patent Application No. 62/703,207 by Chendamarai Kannan et al., entitled "ENHANCED CLEAR CHANNEL ASSESSMENT FOR SHARED RADIO FREQUENCY SPECTRUM BAND," filed Jul. 25, 2018, assigned to the assignee hereof, and expressly incorporated herein.

BACKGROUND

The following relates generally to wireless communications, and more specifically to enhanced clear channel assessment (eCCA) for shared radio frequency spectrum band.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

Wireless communication systems may operate in millimeter wave (mmW) frequency ranges, e.g., 28 GHz, 40 GHz, 60 GHz, etc. Wireless communications at these frequencies may be associated with increased signal attenuation (e.g., path loss), which may be influenced by various factors, such as temperature, barometric pressure, diffraction, etc. As a result, signal processing techniques, such as beamforming, may be used to coherently combine energy and overcome the path losses at these frequencies. Due to the increased amount of path loss in mmW communication systems, transmissions from the base station and/or the UE may be beamformed. Moreover, a receiving device may use beamforming techniques to configure antenna(s) and/or antenna array(s) such that transmissions are received in a directional manner.

Certain wireless communication systems may operate in a shared or unlicensed radio frequency spectrum band. For example, the base station and/or UE may perform a listen-before-talk (LBT) procedure or other clear channel assessment (CCA) procedure on channel(s) in order to capture the medium for a transmission. When the LBT procedure is unsuccessful (e.g., the channel(s) is/are busy, energy is detected on the channel, and the like), the base station and/or UE may perform a backoff procedure where the device waits before attempting to capture the medium again to perform the transmission. Conventional medium capture techniques, however, are inefficient, ineffective, and generally do not provide a mechanism where the channel can be captured and/or reserved for a suitable time period to perform communications. For example, conventional techniques typically require both devices to perform an LBT procedure before transmitting on the medium, which can be inefficient when the devices are performing ongoing wireless communications (e.g., uplink and downlink communications, or vice versa). Conventional medium capture/reservation techniques are further complicated when the devices are operating in a mmW network or other network, where omni-directional or directional LBT procedures can be performed.

SUMMARY

The described techniques relate to improved methods, systems, devices, and apparatuses that support enhanced clear channel assessment (eCCA) for shared radio frequency spectrum band. Generally, the described techniques provide varying techniques for transmitter-based energy detection clear channel assessment (CCA) procedures for medium reservation. In some aspects, a base station and a user equipment (UE) may be operating on a shared or unlicensed radio frequency spectrum band. The base station may transmit a control signal to the UE that includes or otherwise conveys an indication of a grant of time/frequency resources for a downlink transmission. During a gap between transmission of the control signal and the downlink transmission, the base station may perform a CCA procedure on the shared or unlicensed radio frequency spectrum band. Dependent upon the results of the CCA procedure (e.g., based on the CCA procedure being successful), the base station may perform the downlink transmission to the UE over the shared radio frequency spectrum band.

In some aspects, the base station may communicate with multiple UEs over the shared or unlicensed radio frequency spectrum band. In some aspects, the base station may determine that it has downlink transmissions to transmit to two or more of the UEs over the shared or unlicensed radio frequency spectrum band. Accordingly, the base station may perform an extended CCA procedure to obtain access to the shared radio frequency spectrum band for a transmission opportunity. Dependent on the results of the extended CCA procedure (e.g., the extended CCA procedure being successful), the base station may perform a first downlink transmission to a first UE over the shared radio frequency spectrum band. In some aspects, the base station may perform a one-shot CCA procedure on the shared radio frequency spectrum band for a scheduled second downlink transmission to a second UE within the transmission opportunity. Depending on the results of the one-shot CCA procedure, the base station may perform a second downlink transmission to the second UE over the shared radio frequency spectrum band. In some aspects, the base station may perform the one-shot CCA procedure based on the second downlink transmission being within the transmission opportunity.

In some aspects, a UE may communicate with a base station over a shared or unlicensed radio frequency spectrum band. The UE may receive a control signal from the base station that carries or otherwise conveys an indication that the base station has obtained access to the shared radio frequency spectrum band for an uplink transmission from the UE (e.g., the control signal may include or otherwise convey an indication of a grant of resource(s) for the uplink transmission). In response, the UE may perform a one-shot CCA procedure on the shared radio frequency spectrum band at the beginning of a time period corresponding to the uplink transmission. Based on the results of the one-shot CCA procedure, the UE may perform the uplink transmission to the base station over the shared radio frequency spectrum band. In some aspects, the base station may transmit a filler signal from an end of the control signal transmission to a scheduled beginning of the time period corresponding to the uplink transmission.

A method of wireless communication at a base station is described. The method may include transmitting to a UE a control signal including a grant for a downlink transmission, performing, during a gap between the control signal and the downlink transmission, a CCA procedure on a shared radio frequency spectrum band associated with the downlink transmission, and performing, based on a success of the CCA procedure, the downlink transmission to the UE over the shared radio frequency spectrum band.

An apparatus for wireless communication at a base station is described. The apparatus may include a processor, memory in electronic communication with the processor, and instructions stored in the memory. The instructions may be executable by the processor to cause the apparatus to transmit to a UE a control signal including a grant for a downlink transmission, perform, during a gap between the control signal and the downlink transmission, a CCA procedure on a shared radio frequency spectrum band associated with the downlink transmission, and perform, based on a success of the CCA procedure, the downlink transmission to the UE over the shared radio frequency spectrum band.

Another apparatus for wireless communication at a base station is described. The apparatus may include means for transmitting to a UE a control signal including a grant for a downlink transmission, performing, during a gap between the control signal and the downlink transmission, a CCA procedure on a shared radio frequency spectrum band associated with the downlink transmission, and performing, based on a success of the CCA procedure, the downlink transmission to the UE over the shared radio frequency spectrum band.

A non-transitory computer-readable medium storing code for wireless communication at a base station is described. The code may include instructions executable by a processor to transmit to a UE a control signal including a grant for a downlink transmission, perform, during a gap between the control signal and the downlink transmission, a CCA procedure on a shared radio frequency spectrum band associated with the downlink transmission, and perform, based on a success of the CCA procedure, the downlink transmission to the UE over the shared radio frequency spectrum band.

Some examples of the method, apparatuses, and non-transitory computer-readable medium described herein may further include operations, features, means, or instructions for receiving an acknowledgement message for the downlink transmission during a CCA-free acknowledgment period following the downlink transmission.

Some examples of the method, apparatuses, and non-transitory computer-readable medium described herein may further include operations, features, means, or instructions for performing, before transmitting the control signal, a one-shot CCA procedure on the shared radio frequency spectrum band based on the downlink transmission.

In some examples of the method, apparatuses, and non-transitory computer-readable medium described herein, the CCA procedure includes at least one of an omni-directional CCA procedure or a directional CCA procedure.

In some examples of the method, apparatuses, and non-transitory computer-readable medium described herein, the CCA procedure includes at least one of an extended CCA procedure or a one-shot CCA procedure.

In some examples of the method, apparatuses, and non-transitory computer-readable medium described herein, the CCA procedure includes a category 2 LBT procedure.

Some examples of the method, apparatuses, and non-transitory computer-readable medium described herein may further include operations, features, means, or instructions for performing the CCA procedure and the downlink transmission at a boundary of a slot.

A method of wireless communication at a base station is described. The method may include performing an extended CCA procedure to obtain access to a shared radio frequency spectrum band for a transmission opportunity, performing, based on a result of the extended CCA procedure, a first downlink transmission to a first UE over the shared radio frequency spectrum band, performing a one-shot CCA procedure on the shared radio frequency spectrum based on a scheduled second downlink transmission to a second UE within the transmission opportunity, and performing, based on a result of the one-shot CCA procedure, the second downlink transmission to the second UE over the shared radio frequency spectrum band.

An apparatus for wireless communication at a base station is described. The apparatus may include a processor, memory in electronic communication with the processor, and instructions stored in the memory. The instructions may be executable by the processor to cause the apparatus to perform an extended CCA procedure to obtain access to a shared radio frequency spectrum band for a transmission opportunity, perform, based on a result of the extended CCA procedure, a first downlink transmission to a first UE over the shared radio frequency spectrum band, perform a one-shot CCA procedure on the shared radio frequency spectrum based on a scheduled second downlink transmission to a second UE within the transmission opportunity, and perform, based on a result of the one-shot CCA procedure, the second downlink transmission to the second UE over the shared radio frequency spectrum band.

Another apparatus for wireless communication at a base station is described. The apparatus may include means for performing an extended CCA procedure to obtain access to a shared radio frequency spectrum band for a transmission opportunity, performing, based on a result of the extended CCA procedure, a first downlink transmission to a first UE over the shared radio frequency spectrum band, performing a one-shot CCA procedure on the shared radio frequency spectrum based on a scheduled second downlink transmission to a second UE within the transmission opportunity, and performing, based on a result of the one-shot CCA procedure, the second downlink transmission to the second UE over the shared radio frequency spectrum band.

A non-transitory computer-readable medium storing code for wireless communication at a base station is described. The code may include instructions executable by a processor to perform an extended CCA procedure to obtain access to a shared radio frequency spectrum band for a transmission opportunity, perform, based on a result of the extended CCA procedure, a first downlink transmission to a first UE over the shared radio frequency spectrum band, perform a one-shot CCA procedure on the shared radio frequency spectrum based on a scheduled second downlink transmission to a second UE within the transmission opportunity, and perform, based on a result of the one-shot CCA procedure, the second downlink transmission to the second UE over the shared radio frequency spectrum band.

Some examples of the method, apparatuses, and non-transitory computer-readable medium described herein may further include operations, features, means, or instructions for receiving a first acknowledgment message from the first UE for the first downlink transmission during a first CCA-free acknowledgment period following the first downlink transmission.

Some examples of the method, apparatuses, and non-transitory computer-readable medium described herein may further include operations, features, means, or instructions for receiving a second acknowledgment message from the second UE for the second downlink transmission during a second CCA-free acknowledgment period following the second downlink transmission.

In some examples of the method, apparatuses, and non-transitory computer-readable medium described herein, the extended CCA procedure includes an omni-directional CCA procedure or a directional CCA procedure.

A method of wireless communication at a UE is described. The method may include receiving a control signal indicating that a base station has obtained access to a shared radio frequency spectrum band, the control signal including a grant for an uplink transmission, performing, based on the grant, a one-shot CCA procedure on the shared radio frequency spectrum band at a beginning of a time period corresponding to the uplink transmission, and performing, based on a result of the one-shot CCA procedure, the uplink transmission to the base station.

An apparatus for wireless communication at a UE is described. The apparatus may include a processor, memory in electronic communication with the processor, and instructions stored in the memory. The instructions may be executable by the processor to cause the apparatus to receive a control signal indicating that a base station has obtained access to a shared radio frequency spectrum band, the control signal including a grant for an uplink transmission, perform, based on the grant, a one-shot CCA procedure on the shared radio frequency spectrum band at a beginning of a time period corresponding to the uplink transmission, and perform, based on a result of the one-shot CCA procedure, the uplink transmission to the base station.

Another apparatus for wireless communication at a UE is described. The apparatus may include means for receiving a control signal indicating that a base station has obtained access to a shared radio frequency spectrum band, the control signal including a grant for an uplink transmission, performing, based on the grant, a one-shot CCA procedure on the shared radio frequency spectrum band at a beginning of a time period corresponding to the uplink transmission, and performing, based on a result of the one-shot CCA procedure, the uplink transmission to the base station.

A non-transitory computer-readable medium storing code for wireless communication at a UE is described. The code may include instructions executable by a processor to receive a control signal indicating that a base station has obtained access to a shared radio frequency spectrum band, the control signal including a grant for an uplink transmission, perform, based on the grant, a one-shot CCA procedure on the shared radio frequency spectrum band at a beginning of a time period corresponding to the uplink transmission, and perform, based on a result of the one-shot CCA procedure, the uplink transmission to the base station.

Some examples of the method, apparatuses, and non-transitory computer-readable medium described herein may further include operations, features, means, or instructions for receiving a filler signal transmitted by the base station from an end of the control signal to the scheduled beginning of the time period.

Some examples of the method, apparatuses, and non-transitory computer-readable medium described herein may further include operations, features, means, or instructions for transmitting an acknowledgement message to the base station in response to receiving the control signal during a first CCA-free acknowledgement period following the received control signal.

In some examples of the method, apparatuses, and non-transitory computer-readable medium described herein, the time period corresponding to the uplink transmission is based at least in part on a frame delay value of the radio frequency spectrum band.

Some examples of the method, apparatuses, and non-transitory computer-readable medium described herein may further include operations, features, means, or instructions for determining that the one-shot CCA procedure was unsuccessful and performing a second one-shot CCA procedure on the shared radio frequency spectrum band at a beginning of a second time period configured for the uplink transmission.

Some examples of the method, apparatuses, and non-transitory computer-readable medium described herein may further include operations, features, means, or instructions for determining that the one-shot CCA procedure was unsuccessful and discarding the grant.

DETAILED DESCRIPTION

Figure 1:
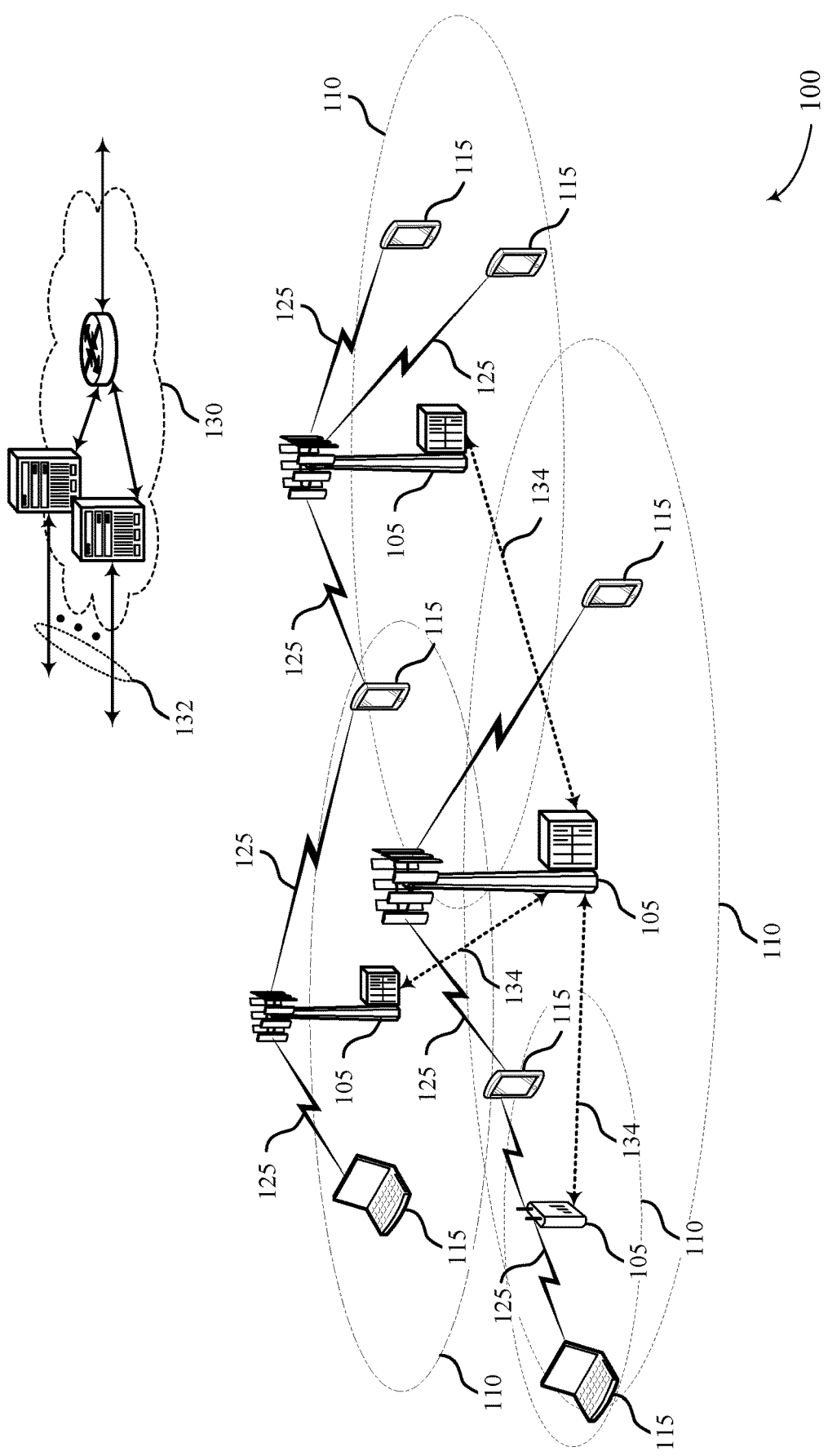
FIG. 1 illustrates an example of a system for wireless communications that supports enhanced clear channel assessment (eCCA) for shared radio frequency spectrum band in accordance with aspects of the present disclosure.

Some wireless communication systems may operate in millimeter wave (mmW) frequency ranges (e.g., 28 GHz, 40 GHz, 60 GHz, etc.). In some cases, wireless communication at these frequencies may be associated with increased signal attenuation (e.g., path loss), which may be influenced by various factors, such as temperature, barometric pressure, diffraction, etc. As a result, signal processing techniques such as beamforming (i.e., directional transmission) may be used to coherently combine signal energy and overcome the path loss in specific beam directions. In some cases, a device may select an active beam for communicating with a network by selecting the strongest beam from among a number of candidate beams.

In some aspects, wireless communication systems may operate in a shared or unlicensed radio frequency spectrum band where the devices may perform a listen-before-talk (LBT) procedure, such as a clear channel assessment (CCA) procedure, to capture the medium or channel before performing a wireless transmission. Conventional LBT procedures, however, are inefficient and may not provide suitable flexibility to the devices for capturing and reserving the medium to perform communications (e.g., uplink and downlink communications), without requiring each device to perform a lengthy or inappropriate LBT procedure before transmitting on the channel.

Aspects of the disclosure are initially described in the context of a wireless communication system. Broadly, the described techniques provide varying techniques for transmitter-based energy detection CCA procedures for medium reservation. In some aspects, a base station may communicate with a UE over a shared or unlicensed radio frequency spectrum band. The base station may transmit a control signal to the UE that includes or otherwise conveys an indication of a grant of resource(s) for a downlink transmission. During a gap between transmission of the control signal and the downlink transmission, the base station may perform a CCA procedure on the shared or unlicensed radio frequency spectrum band. Dependent upon the results of the CCA procedure, the base station may perform the downlink transmission to the UE over the shared radio frequency spectrum band.

In some aspects, the base station may communicate with multiple UEs over the shared or unlicensed radio frequency spectrum band. In some aspects, the base station may determine that it has downlink transmissions to transmit to more than one of the UEs over the shared or unlicensed radio frequency spectrum band. Accordingly, the base station may perform an extended CCA procedure to obtain access to the shared radio frequency spectrum band for a transmission opportunity. Dependent on the results of the extended CCA procedure, the base station may perform the first downlink transmission to a first UE over the shared radio frequency spectrum band. In some aspects, the base station may perform a one-shot CCA procedure on the shared radio frequency spectrum band for a scheduled second downlink transmission to a second UE within the transmission opportunity. Again, depending on the results of the one-shot CCA procedure, the base station may perform a second downlink transmission to the second UE over the shared radio frequency spectrum band. In some aspects, the base station may perform the one-shot CCA procedure based on the second downlink transmission being within the transmission opportunity.

In some aspects, a UE may communicate with a base station over a shared or unlicensed radio frequency spectrum band. The UE may receive a control signal from the base station that carries or otherwise conveys an indication that the base station has obtained access to the shared radio frequency spectrum band for an uplink transmission from the UE, (e.g., the control signal may include or otherwise convey an indication of a grant of resources for the uplink transmission). In response to the control signal, the UE may perform a one-shot CCA procedure on the shared radio frequency spectrum band at the beginning of a time period corresponding to the uplink transmission. Based on the results of the one-shot CCA procedure, the UE may perform the uplink transmission to the base station over the shared radio frequency spectrum band. In some aspects, the base station may transmit a filler signal from an end of the control signal transmission to a schedule beginning of the time period corresponding to the uplink transmission.

Aspects of the disclosure are further illustrated by and described with reference to apparatus diagrams, system diagrams, and flowcharts that relate to eCCA for shared radio frequency spectrum band.

FIG. 1 illustrates an example of a wireless communications system 100 that supports eCCA for shared radio frequency spectrum band in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as OFDM or DFT-s-OFDM).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

In some aspects, a base station 105 may transmit to a UE 115 a control signal comprising a grant for a downlink transmission. The base station 105 may perform, during a gap between the control signal and the downlink transmission, a CCA procedure on a shared radio frequency spectrum associated with the downlink transmission. The base station 105 may perform, based at least in part on a success of the CCA procedure, the downlink transmission to the UE 115 over the shared radio frequency spectrum band.

In some aspects, a base station 105 may perform an extended CCA procedure to obtain access to a shared radio frequency spectrum band for a transmission opportunity. The base station 105 may perform, based at least in part on a result of the extended CCA procedure, a first downlink transmission to a first UE 115 over the shared radio frequency spectrum band. The base station 105 may perform a one-shot CCA procedure on the shared radio frequency spectrum based at least in part on a scheduled second downlink transmission to a second UE 115 within the transmission opportunity. The base station 105 may perform, based at least in part on a result of the one-shot CCA procedure, the second downlink transmission to the second UE 115 over the shared radio frequency spectrum band.

In some aspects, a UE 115 may receive a control signal indicating that a base station 105 has obtained access to a shared radio frequency spectrum band, the control signal comprising a grant for an uplink transmission. The UE 115 may perform, based at least in part on the grant, a one-shot CCA procedure on the shared radio frequency spectrum band at a beginning of a time period corresponding to the uplink transmission. The UE 115 may perform, based at least in part on a result of the one-shot CCA procedure, the uplink transmission to the base station 105.

Figure 2:
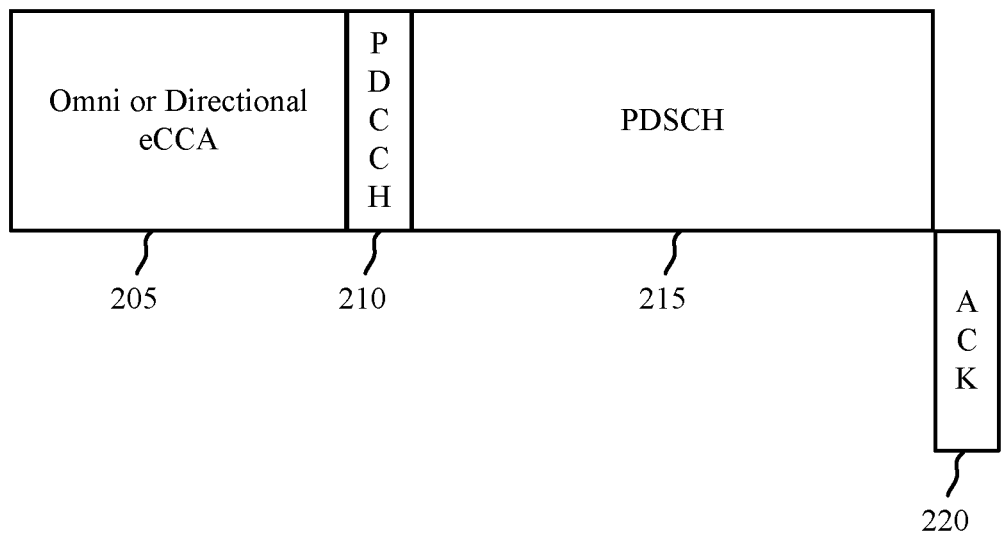
FIG. 2 illustrates an example of a medium reservation scheme that supports eCCA for shared radio frequency spectrum band in accordance with aspects of the present disclosure.

FIG. 2 illustrates an example of a medium reservation scheme 200 that supports eCCA for shared radio frequency spectrum band in accordance with aspects of the present disclosure. In some examples, medium reservation scheme 200 may implement aspects of wireless communication system 100. Aspects of medium reservation scheme 200 may be implemented by a base station and/or a UE, which may be examples of the corresponding devices described herein. In some aspects, medium reservation scheme 200 may be implemented in a wireless communication system, such as a mmW wireless network. In some aspects, medium reservation scheme 200 illustrates a transmitter energy detection-based scheme for medium reservation.

Generally, a base station and UE may be operating in a shared or unlicensed radio frequency spectrum band. In some aspects, the base station and UE may be operating in a mmW network. The base station may determine that it has a downlink transmission to transmit to the UE. Accordingly, the base station may therefore begin performing a CCA procedure 205 on a channel of the shared radio frequency spectrum band. In some aspects, the CCA procedure 205 may be an LBT procedure, such as an extended CCA procedure. In some aspects, the CCA procedure 205 may be an omni-directional CCA procedure or a directional CCA procedure. For example, in some aspects an omni-directional CCA procedure may be used when the base station has downlink transmissions to transmit to multiple UEs. In some aspects, a directional CCA procedure may improve the chances of success of the CCA procedure 205. In some aspects, other considerations may determine whether CCA procedure 205 is directional or omni-directional.

In some aspects, the CCA procedure 205 may include a countdown period plus an energy detection period. As one non-limiting example the countdown period may take eight microseconds (µs) to perform and the energy detection period may take from (0.1 to 125)*5 µs. Therefore, the CCA procedure 205 may occur over a maximum period of 643 µs, (e.g., 42 slots at 960 kHz).

Based on the results of the CCA procedure 205 (e.g., based on the CCA procedure 205 being successful), the base station may begin the downlink transmission to the UE by transmitting control signal 210 (e.g., PDCCH), which carries or otherwise provides an indication of the grant of resources for the downlink transmission. The base station may continue the downlink transmission to the UE by transmitting data 215 (e.g., PDSCH), to the UE. In some aspects, base station may perform the downlink message to the UE over the shared radio.

In some aspects, the UE may receive the downlink transmission, decode the data 215, and respond by transmitting feedback information 220 to the base station (e.g., acknowledgment/negative acknowledgement (ACK/NACK) message). Generally, the feedback information 220 may carry or otherwise provide an indication of whether the UE was able to successfully receive and decode the downlink transmission. In some aspects, the UE may transmit the feedback information 220 (e.g., an ACK message) during a CCA-free acknowledgment period that follows the downlink transmission. That is, the UE may transmit the feedback information without performing a CCA procedure on the shared or unlicensed spectrum.

In some aspects, the base station may perform the CCA procedure 205 and the corresponding downlink transmission to the UE at a slot boundary.

Figure 3:
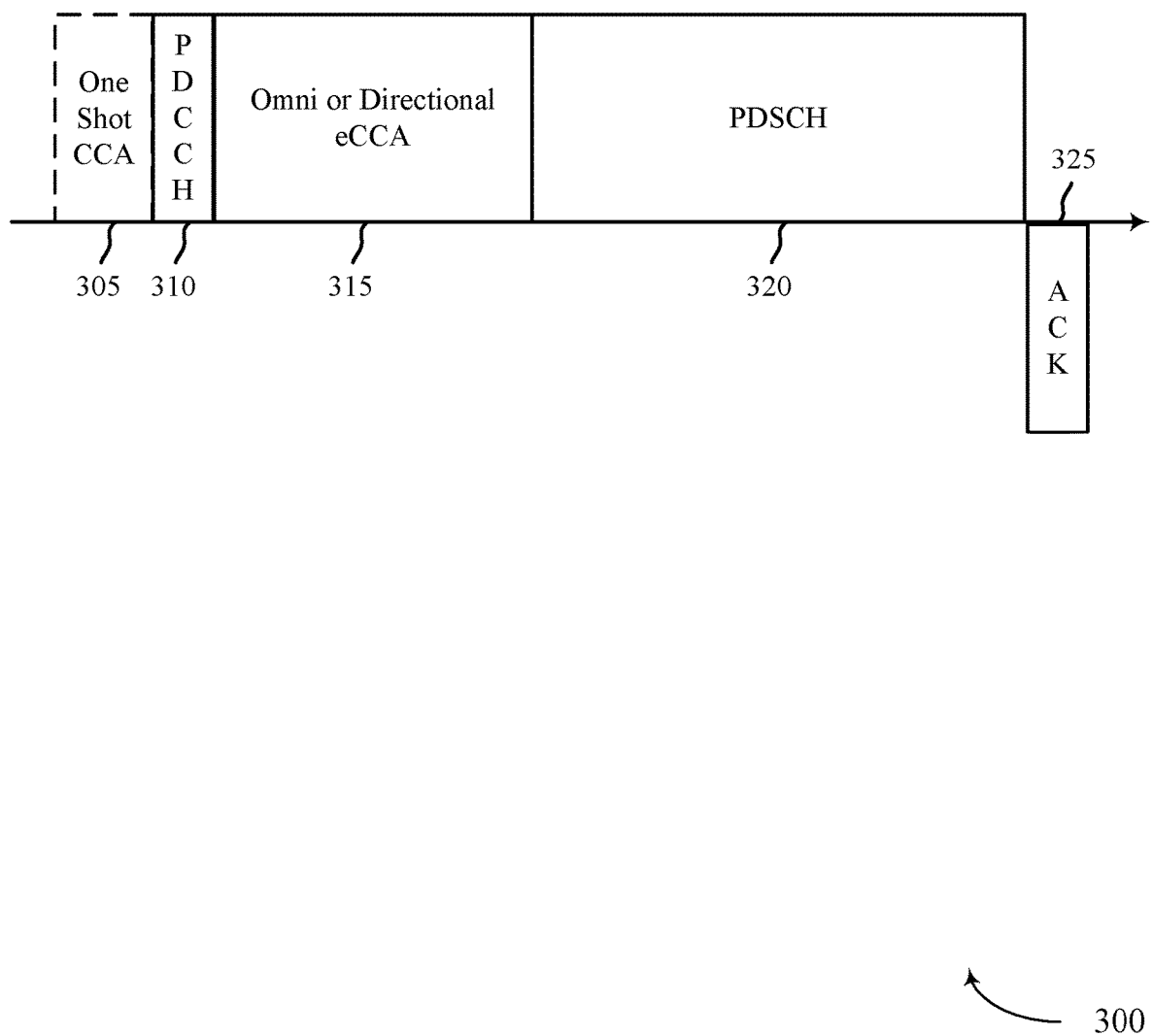
FIG. 3 illustrates an example of a medium reservation scheme that supports eCCA for shared radio frequency spectrum band in accordance with aspects of the present disclosure.

FIG. 3 illustrates an example of a medium reservation scheme 300 that supports eCCA for shared radio frequency spectrum band in accordance with aspects of the present disclosure. In some examples, medium reservation scheme 300 may implement aspects of wireless communication system 100 and/or medium reservation scheme 200. Aspects of medium reservation scheme 300 may be implemented by a base station and/or a UE, which may be examples of the corresponding devices described herein. In some aspects, medium reservation scheme 300 may be implemented in a wireless communication system, such as a mmW wireless network or other network. In some aspects, medium reservation scheme 300 illustrates a transmitter energy detection-based scheme for medium reservation.

Generally, a base station and UE may be operating in a shared or unlicensed radio frequency spectrum band. In some aspects, the base station and UE may be operating in a mmW network. The base station may determine that it has a downlink transmission to transmit to the UE. The base station may optionally begin performing a one-shot CCA procedure 305 on a channel of the shared radio frequency spectrum band. In some aspects, the CCA procedure 305 may be a one-shot LBT procedure.

Based on the result of the one-shot CCA procedure 305 being successful, the base station may transmit a control signal 310 (e.g., PDCCH), which carries or otherwise provides an indication of a grant of resources for the downlink transmission.

During a gap between transmission of the control signal 310 and the downlink transmission, the base station may perform a CCA procedure 315 on the shared radio frequency spectrum band associated with the downlink transmission. In some aspects, the CCA procedure 315 may be a one-shot CCA procedure or an extended CCA procedure. In some aspects, the CCA procedure 315 may be an omni-directional CCA procedure or directional CCA procedure. Generally, directional CCA procedure includes a base station monitoring for energy on the channel in a given direction (e.g., in the direction of the UE). In contrast, an omnidirectional CCA procedure includes a base station monitoring for energy on the channel in all directions. In one non-limiting example, the CCA procedure 315 may be a category 2 LBT procedure.

Base on a result of the CCA procedure 315 (e.g., based on the CCA procedure 315 being successful), the base station may continue the downlink transmission to the UE by transmitting data 320 (e.g., PDSCH), to the UE. In some aspects, the UE may monitor for one or more reference signals (e.g., a demodulation reference signal (DMRS)) to detect for the presence of data 320.

In some aspects, the UE may receive the downlink transmission, decode the data 320, and respond by transmitting feedback information 325 to the base station (e.g., ACK/NACK message). Generally, the feedback information 325 may carry or otherwise provide an indication of whether the UE was able to successfully receive and decode the downlink transmission. In some aspects, the UE may transmit the feedback information 325 (e.g., an ACK message)

during a CCA-free acknowledgment period that follows the downlink transmission. That is, the UE may transmit the feedback information 325 without performing a CCA procedure on the shared or unlicensed spectrum. In some aspects, the UE may skip the CCA procedure 315 if it is configured with a K1 value that is less than a defined threshold, and perform the CCA procedure 315 if it is configured with a K1 value is greater than the defined threshold.

Thus, the base station may perform a one-shot CCA (e.g., an LBT) procedure plus control signal transmission, or a skip the one-shot CCA procedure and just perform the control signal transmission. Base station may follow by performing the CCA procedure 315 (e.g., extended CCA or one-shot LBT) followed by the data transmission. This may result in a floating data transmission aligned to the nearest slot boundary.

Figure 4:
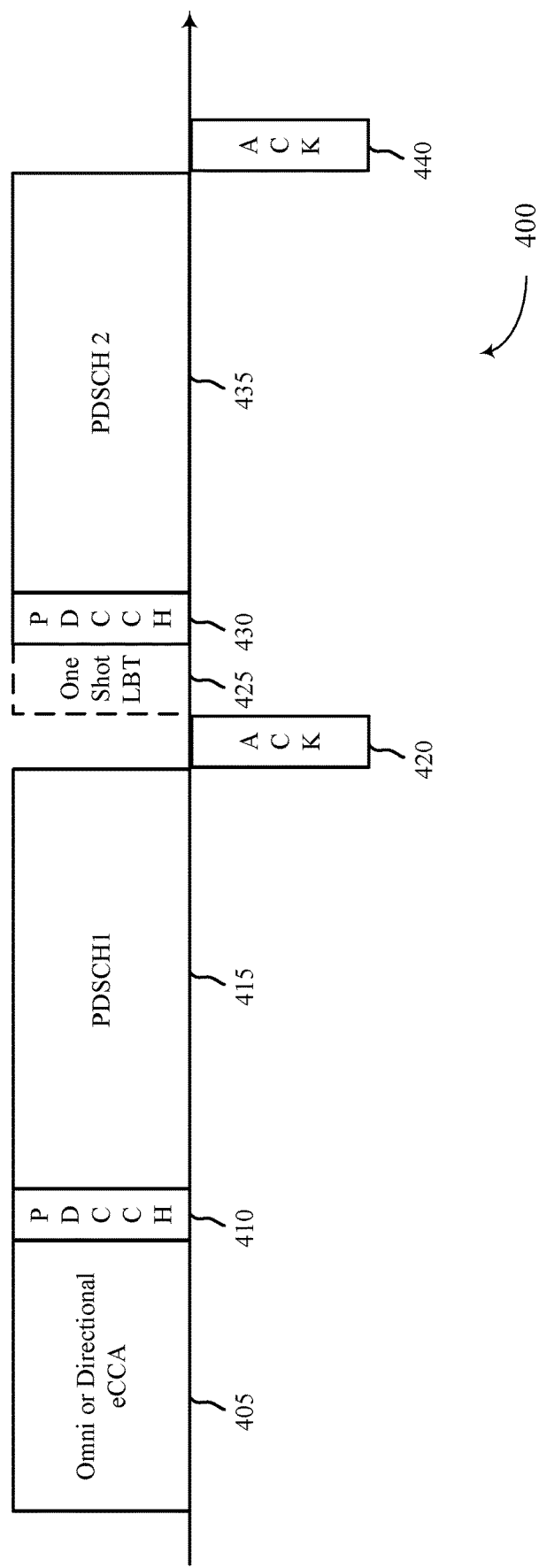
FIG. 4 illustrates an example of a medium reservation scheme that supports eCCA for shared radio frequency spectrum band in accordance with aspects of the present disclosure.

FIG. 4 illustrates an example of a medium reservation scheme 400 that supports eCCA for shared radio frequency spectrum band in accordance with aspects of the present disclosure. In some examples, medium reservation scheme 400 may implement aspects of wireless communication system 100 and/or medium reservation schemes 200/300. Aspects of medium reservation scheme 400 may be implemented by a base station and/or a UE, which may be examples of the corresponding devices described herein. In some aspects, medium reservation scheme 400 may be implemented in a wireless communication system, such as a mmW wireless network. In some aspects, medium reservation scheme 400 illustrates a transmitter energy detection-based scheme for medium reservation.

Generally, a base station and one or more UEs may be operating in a shared or unlicensed radio frequency spectrum band. In some aspects, the base station and UEs may be operating in a mmW network or other network. The base station may determine that it has a downlink transmission to transmit to some of the UEs. In some aspects, the base station may begin performing a CCA procedure 405 on a channel of the shared radio frequency spectrum band. In some aspects, the CCA procedure 405 may be an LBT procedure, such as an extended CCA procedure or a short CCA procedure. In some aspects, the CCA procedure 405 may be an omni-directional CCA procedure or a directional CCA procedure. In some aspects, the base station may perform the CCA procedure 405 to obtain access to the shared radio frequency spectrum band for a transmission opportunity. In some aspects, the transmission opportunity may include or otherwise cover a period of time for the base station to perform downlink transmissions to the UEs. In some examples, the transmission opportunity may span one or more mini-slots, slots, subframes, frames, and the like.

In some aspects, an omni-directional CCA procedure may provide an advantage of scheduling flexibility (e.g., may provide scheduling for multiple UEs within the transmission opportunity). In some aspects, the omni-directional CCA procedure and directional CCA procedure may use different energy detection threshold levels.

Based at least in part on a result of the CCA procedure 405 (e.g., based on CCA procedure 405 being successful), the base station may begin a first downlink transmission to a first UE by transmitting control signal 410 (e.g., PDCCH), which carries or otherwise provides an indication of the grant of resources for the downlink transmission first UE. The base station may continue the downlink transmission to the first UE by transmitting data 415 (e.g., PDSCH), to the first UE.

In some aspects, the first UE may receive the downlink transmission, decode the data 415, and respond by transmitting feedback information 420 to the base station (e.g., ACK/NACK message). Generally, the feedback information 420 may carry or otherwise provide an indication of whether the first UE was able to successfully receive and decode the downlink transmission. In some aspects, the first UE may transmit the feedback information 420 (e.g., an ACK message) during a CCA-free acknowledgment period that follows the downlink transmission. That is, the first UE may transmit the feedback information 420 without performing a CCA procedure on the shared or unlicensed spectrum. In some aspects, the UE may skip the CCA procedure if it is configured with a K1 value that is less than a defined threshold, and perform the CCA procedure if its configured K1 value is greater than the defined threshold.

For the downlink transmission to the second UE, the base station may begin performing a CCA procedure 425 on the channel of the shared radio frequency spectrum band. In some aspects, the CCA procedure 425 may be an LBT procedure, such as a one-shot LBT procedure. In some aspects, the base station may perform the CCA procedure 425 during or within the transmission opportunity. In some aspects, a one-shot CCA procedure is shorter in duration than the conventional CCA procedure (e.g., such as an extended CCA procedure or a short CCA procedure).

Based at least in part on a result of the CCA procedure 425 (e.g., based on CCA procedure 425 being successful), the base station may begin the second downlink transmission to the second UE by transmitting control signal 430 (e.g., PDCCH), which carries or otherwise provides an indication of the grant of resources for the downlink transmission to the second UE. The base station may continue the downlink transmission to the second UE by transmitting data 435 (e.g., PDSCH). In some aspects, the base station may perform the second downlink transmission to the second UE during or within the transmission opportunity.

In some aspects, the second UE may receive the downlink transmission, decode the data 435, and respond by transmitting feedback information 440 to the base station (e.g., ACK/NACK information). Generally, the feedback information 440 may carry or otherwise provide an indication of whether the second UE was able to successfully receive and decode the downlink transmission. In some aspects, the second UE may transmit the feedback information 440 (e.g., an ACK message) during a CCA-free acknowledgment period that follows the downlink transmission. That is, the second UE may transmit the feedback information 440 without performing a CCA procedure on the shared or unlicensed spectrum. In some aspects, the UE may skip the CCA procedure if its configured K1 value is less than a defined threshold, and perform the CCA procedure if its configured K1 value is greater than the defined threshold.

Thus, in some aspects the base station may perform omnidirectional sensing plus a one-shot LBT procedure for every transition between downlink transmissions. In other aspects, the base station may perform omni-directional sensing, but skip (e.g., not perform) the one-shot LBT procedure for every transition between downlink transmissions. In some aspects, the base station may skip the one-shot LBT procedure if the transmission opportunity length is less than a defined threshold.

In some aspects, frame structure delays (e.g., K0, K1, etc., values) may impact control information to data transmission transition and/or data transmission to feedback information transition (e.g., regardless of which CCA or LBT procedure is adopted). In some aspects, the length of the transmission opportunity (e.g., as compared to a contention window size) may be parameterizable.

Figure 5:
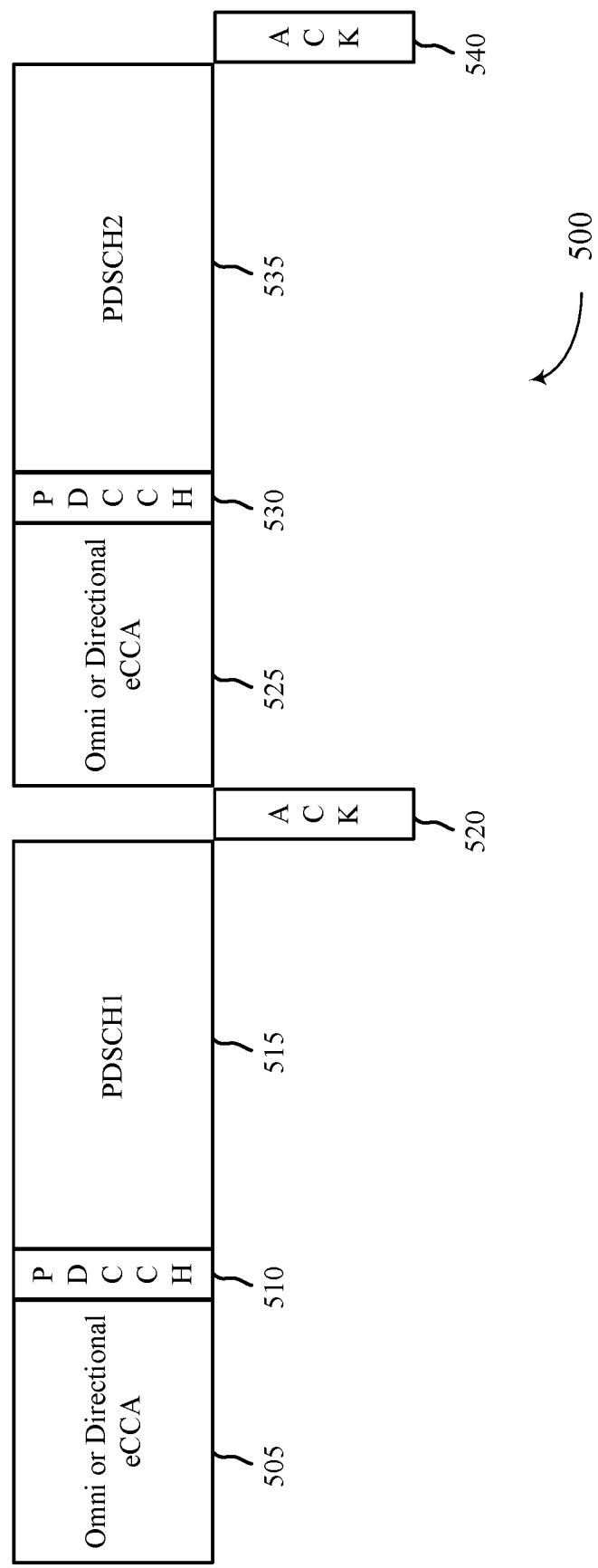
FIG. 5 illustrates an example of a medium reservation scheme that supports eCCA for shared radio frequency spectrum band in accordance with aspects of the present disclosure.

FIG. 5 illustrates an example of a medium reservation scheme 500 that supports eCCA for shared radio frequency spectrum band in accordance with aspects of the present disclosure. In some examples, medium reservation scheme 500 may implement aspects of wireless communication system 100 and/or medium reservation schemes 200/300/400. Aspects of medium reservation scheme 500 may be implemented by a base station and/or a UE, which may be examples of the corresponding devices described herein. In some aspects, medium reservation scheme 500 may be implemented in a wireless communication system, such as a mmW wireless network or other wireless network. In some aspects, medium reservation scheme 500 illustrates a transmitter energy detection-based scheme for medium reservation.

Generally, a base station and one or more UEs may be operating in a shared or unlicensed radio frequency spectrum band. In some aspects, the base station and UEs may be operating in a mmW network. The base station may determine that it has a downlink transmission to transmit to two or more of the UEs. For the first downlink transmission, the base station may begin performing a CCA procedure 505 on a channel of the shared radio frequency spectrum band. In some aspects, the CCA procedure 505 may be an LBT procedure, such as an extended CCA procedure. In some aspects, the CCA procedure 505 may be an omni-directional CCA procedure or a directional CCA procedure. In some aspects, the base station may perform the CCA procedure 505 to obtain access to the shared radio frequency spectrum band for a transmission opportunity. In some aspects, the transmission opportunity may include or otherwise cover a period of time for the base station to perform downlink transmissions to at least two UEs. In some examples, the transmission opportunity may span one or more mini-slots, slots, subframes, frames, and the like.

Based at least in part on a result of the CCA procedure 505 (e.g., based on CCA procedure 505 being successful), the base station may begin the first downlink transmission to a first UE by transmitting control signal 510 (e.g., PDCCH), which carries or otherwise provides an indication of a grant of resources for the downlink transmission to the first UE. The base station may continue the downlink transmission to the first UE by transmitting data 515 (e.g., PDSCH), to the first UE.

In some aspects, the first UE may receive the downlink transmission, decode the data 515, and respond by transmitting feedback information 520 to the base station (e.g., ACK/NACK information). Generally, the feedback information 520 may carry or otherwise provide an indication of whether the first UE was able to successfully receive and decode the downlink transmission. In some aspects, the first UE may transmit the feedback information 520 (e.g., an ACK message) during a CCA-free acknowledgment period that follows the downlink transmission.

For the second downlink transmission, the base station may begin performing a CCA procedure 525 on a channel of the shared radio frequency spectrum band. In some aspects, the CCA procedure 525 may be an LBT procedure, such as an extended CCA procedure. In some aspects, the CCA procedure 525 may be an omni-directional CCA procedure or a directional CCA procedure. In some aspects, the base station may perform the CCA procedure 525 to obtain access to the shared radio frequency spectrum band for a transmission opportunity.

Based at least in part on a result of the CCA procedure 525 (e.g., based on CCA procedure 525 being successful, the base station may begin the second downlink transmission to the second UE by transmitting control signal 530 (e.g., PDCCH), which carries or otherwise provides an indication of a grant of resources for the downlink transmission to the second UE. The base station may continue the downlink transmission to the second UE by transmitting data 535 (e.g., PDSCH). In some aspects, the base station may perform the second downlink transmission to the second UE during or within the transmission opportunity.

In some aspects, the second UE may receive the downlink transmission, decode the data 535, and respond by transmitting feedback information 540 to the base station (e.g., ACK/NACK information). Generally, the feedback information 540 may carry or otherwise provide an indication of whether the second UE was able to successfully receive and decode the downlink transmission. In some aspects, the second UE may transmit the feedback information 540 (e.g., an ACK).

In some aspects, frame structure delays (e.g., K0, K1, etc., values) may impact control information to data transmission transition and/or data transmission to feedback information transition (e.g., regardless of which CCA or LBT procedure is adopted).

In some aspects, the length of the transmission opportunity (e.g., as compared to a contention window size), may be parameterizable.

Figure 6:
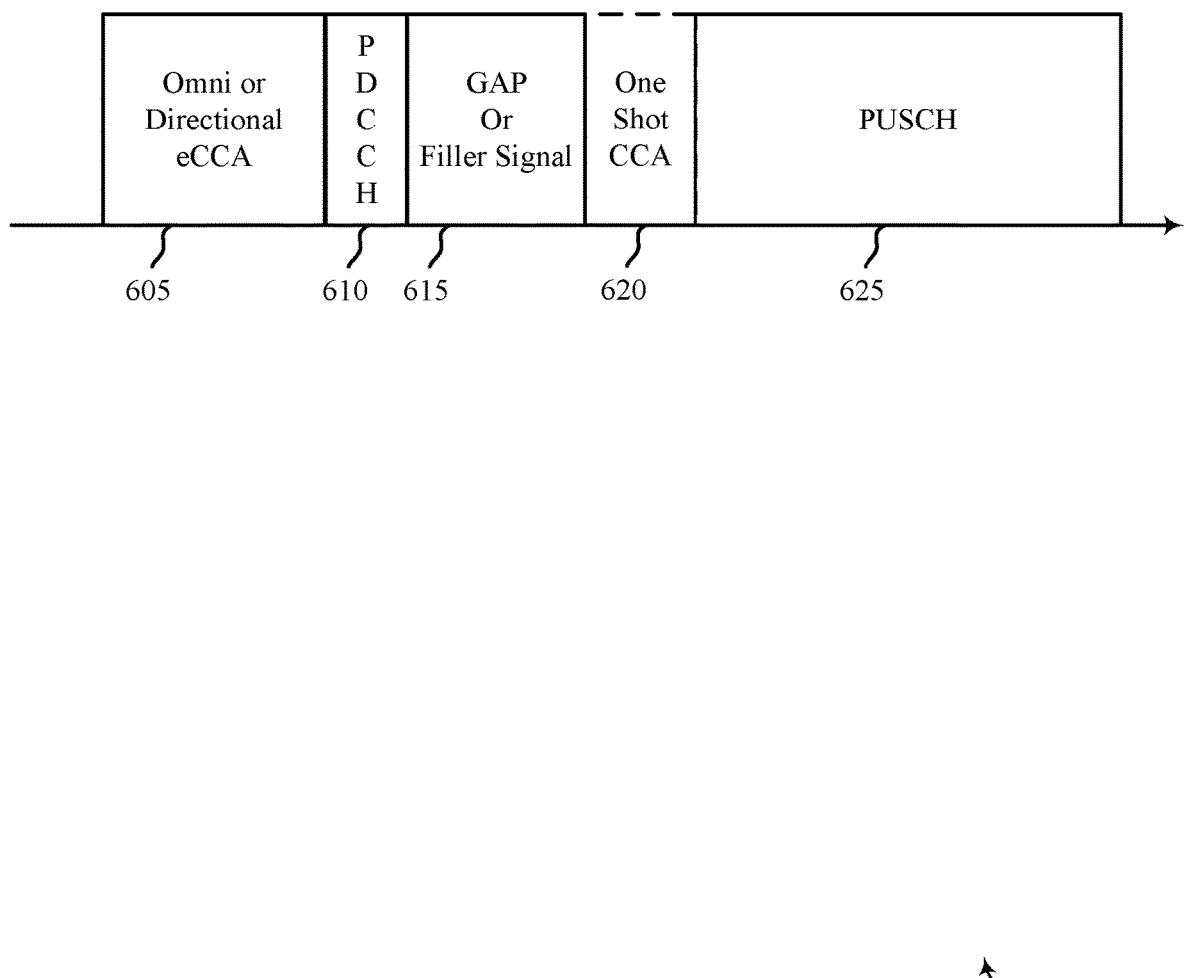
FIG. 6 illustrates an example of a medium reservation scheme that supports eCCA for shared radio frequency spectrum band in accordance with aspects of the present disclosure.

FIG. 6 illustrates an example of a medium reservation scheme 600 that supports eCCA for shared radio frequency spectrum band in accordance with aspects of the present disclosure. In some examples, medium reservation scheme 600 may implement aspects of wireless communication system 100 and/or medium reservation schemes 200/300/400/500. Aspects of medium reservation scheme 600 may be implemented by a base station and/or a UE, which may be examples of the corresponding devices described herein. In some aspects, medium reservation scheme 600 may be implemented in a wireless communication system, such as a mmW wireless network or other wireless network. In some aspects, medium reservation scheme 600 illustrates a transmitter energy detection-based scheme for medium reservation.

Generally, a base station and UE may be operating in a shared or unlicensed radio frequency spectrum band. In some aspects, the base station and UE may be operating in a mmW network. The base station and/or UE may determine that the UE has an uplink transmission to transmit to the base station. Accordingly, the base station may begin performing a CCA procedure 605 on a channel of the shared radio frequency spectrum band. In some aspects, the CCA procedure 605 may be an LBT procedure, such as an extended CCA procedure. In some aspects, the CCA procedure 605 may be an omni-directional CCA procedure or a directional CCA procedure.

Based on the result of the CCA procedure 605, the base station may transmit a control signal 610, which includes or otherwise conveys an indication that the base station has obtained access to the shared radio frequency spectrum band for the uplink transmission. In some aspects, the control signal 610 may include or otherwise convey an indication of a grant of resources for the uplink transmission.

In response to the grant (e.g., the control signal 610), the UE may perform a one-shot CCA procedure 620. In some aspects, the UE may perform the one-shot CCA procedure 620 at the beginning of a time period that corresponds to the uplink transmission (e.g., as indicated in the grant).

In some aspects, there may be a time period 615 between the control signal 610 and the UE performing the one-shot CCA procedure 620. In some aspects, this time period 615 may be left empty (e.g., there may be a gap between the control signal 610 and the UE performing the one-shot CCA procedure 620). In other aspects, the time period 615 may be filled by the base station transmitting a filler signal from the end of the control signal 610 to the scheduled beginning of the time period corresponding to the uplink transmission (e.g., when the UE performs the one-shot CCA procedure 620). In some aspects, the filler signal may act to reserve the channel during the time period 615 (e.g., to prevent other wireless devices from capturing or reserving the medium and interrupting the uplink transmission).

Based at least in part on the results of the one-shot CCA procedure 620 (e.g., based on the one-shot CCA procedure 620 being successful), the UE may perform the uplink transmission to the base station by transmitting data 625 (e.g., PUSCH). In some aspects, the time period corresponding to the uplink transmission may be associated with a K2 value configured for the UE, which generally indicates when the UE is to transmit the data 625.

In some aspects, the one-shot CCA procedure 620 may be unsuccessful (e.g., the UE may not capture the channel to transmit the data 625 according to the grant). In this instance, the UE may perform a second one-shot CCA procedure at one or more locations (e.g., time/frequency resources) configured for the UE. In another example, the UE may simply drop the grant if the one-shot CCA procedure 620 fails.

Thus, in some aspects the base station may perform an extended CCA procedure plus control signal transmission at the slot boundary, and leave the gap until the beginning of the uplink transmission. In other aspects, the base station may perform an extended CCA procedure plus control signal transmission at the slot boundary, plus transmit the filler signal until the beginning of the uplink transmission.

Figure 7:
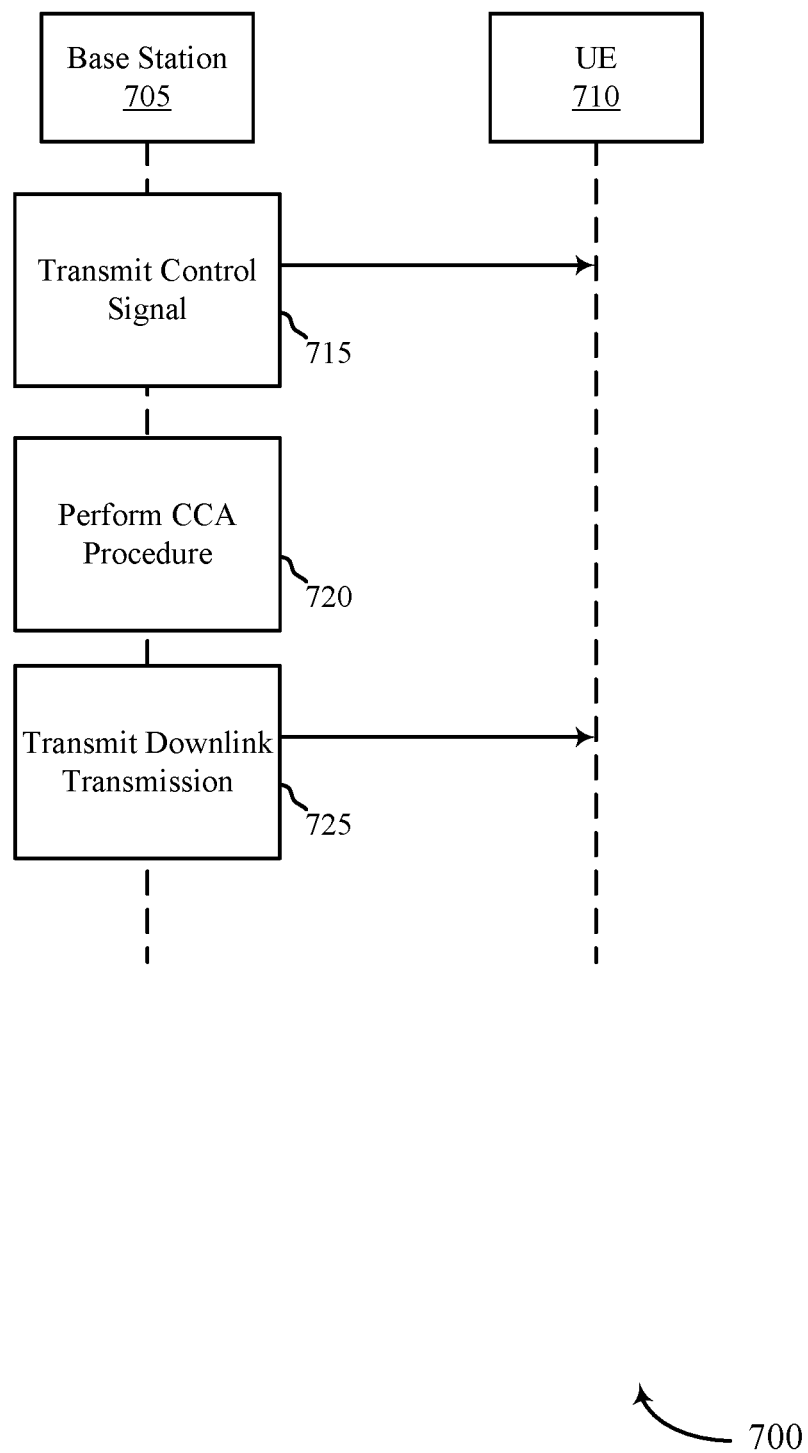
FIG. 7 illustrates an example of a process that supports eCCA for shared radio frequency spectrum band in accordance with aspects of the present disclosure.

FIG. 7 illustrates an example of a process 700 that supports eCCA for shared radio frequency spectrum band in accordance with aspects of the present disclosure. In some examples, process 700 may implement aspects of wireless communication system 100 and/or medium reservation schemes 300/400/500/600. Aspects of process 700 may be implemented by a base station 705 and/or UE 710, which may be examples of the corresponding devices described herein.

At 715, base station 705 may transmit (and UE 710 may receive) a control signal that includes or otherwise conveys an indication of a grant for a downlink transmission. In some aspects, base station 705 may perform a one-shot CCA procedure on the shared radio frequency spectrum band before transmitting the control signal. For example, base station 705 may perform the one-shot CCA procedure based at least in part on the downlink transmission.

At 720, base station 705 may perform, during a gap between the control signal and the downlink transmission, a CCA procedure on a shared radio frequency spectrum band associated with the downlink transmission. In some aspects, the CCA procedure may be an omni-directional CCA procedure or a directional CCA procedure. In some aspects, the CCA procedure may be an extended CCA procedure or a one-shot CCA procedure. In some examples, the CCA procedure may be a category 2 LBT procedure.

At 725, base station 705 may transmit (and UE 710 may receive) the downlink transmission over the shared radio frequency spectrum band based at least in part on a success of a CCA procedure. In some aspects, in response to the downlink transmission, UE 710 may transmit (and base station 705 may receive) an acknowledgment message for the downlink transmission during a CCA-free acknowledgment period following the downlink transmission.

Figure 8:
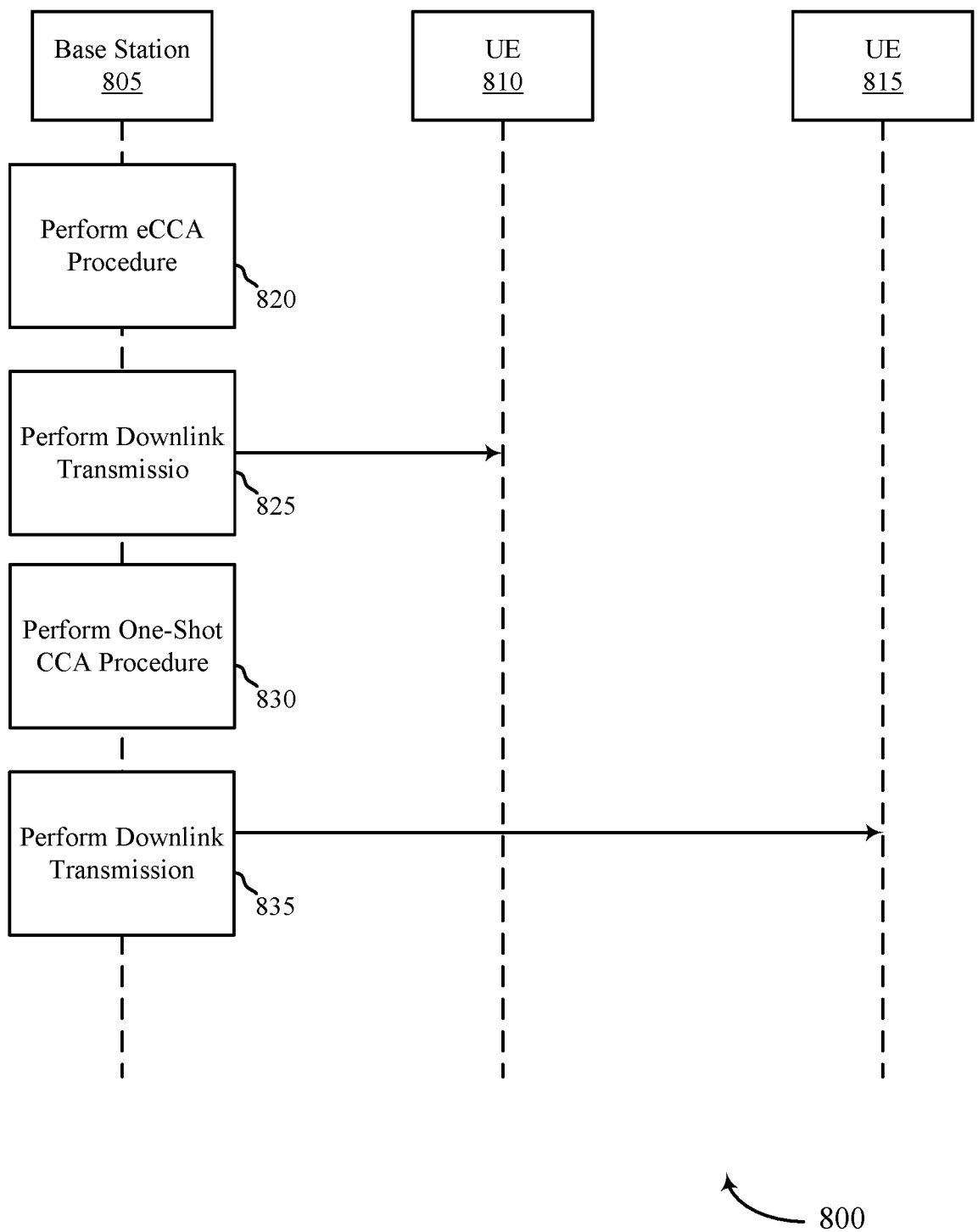
FIG. 8 illustrates an example of a process that supports eCCA for shared radio frequency spectrum band in accordance with aspects of the present disclosure.

FIG. 8 illustrates an example of a process 800 that supports eCCA for shared radio frequency spectrum band in accordance with aspects of the present disclosure. In some examples, process 800 may implement aspects of wireless communication system 100 and/or medium reservation schemes 300/400/500/600. Aspects of process 800 may be implement a by base stations 805, UE 810, and/or UE 815, which may be examples of the corresponding devices described herein. In some aspects, UE 810 may be considered a first UE and UE 815 may be considered a second UE.

At 820, base station 805 may perform an extended CCA procedure to obtain access to a shared radio frequency spectrum band for a transmission opportunity. In some aspects, the extended CCA procedure may be an omni-directional CCA procedure or a directional CCA procedure.

At 825, base station 805 may transmit (and UE 810 may receive) a first downlink transmission over the shared radio frequency spectrum band based at least in part on a result of the extended CCA procedure (e.g., based on the extended CCA procedure being successful). In some aspects, UE 810 may transmit (and base station 805 may receive) a first acknowledgment message for the first downlink transmission during a first CCA free acknowledgment period following the first downlink transmission.

At 830, base station 805 may perform a one-shot CCA procedure on the shared radio frequency spectrum band based at least in part on the scheduled second downlink transmission to UE 815 within the transmission opportunity.

At 835, base station 805 may transmit (and UE 815 may receive) the second downlink transmission over the shared radio frequency spectrum band based at least in part on a result of the one-shot CCA procedure. In some aspects, UE 815 may transmit (and base station 805 may receive) a second acknowledgment message for the second downlink transmission during a second CCA free acknowledgment period following the second downlink transmission.

Figure 9:
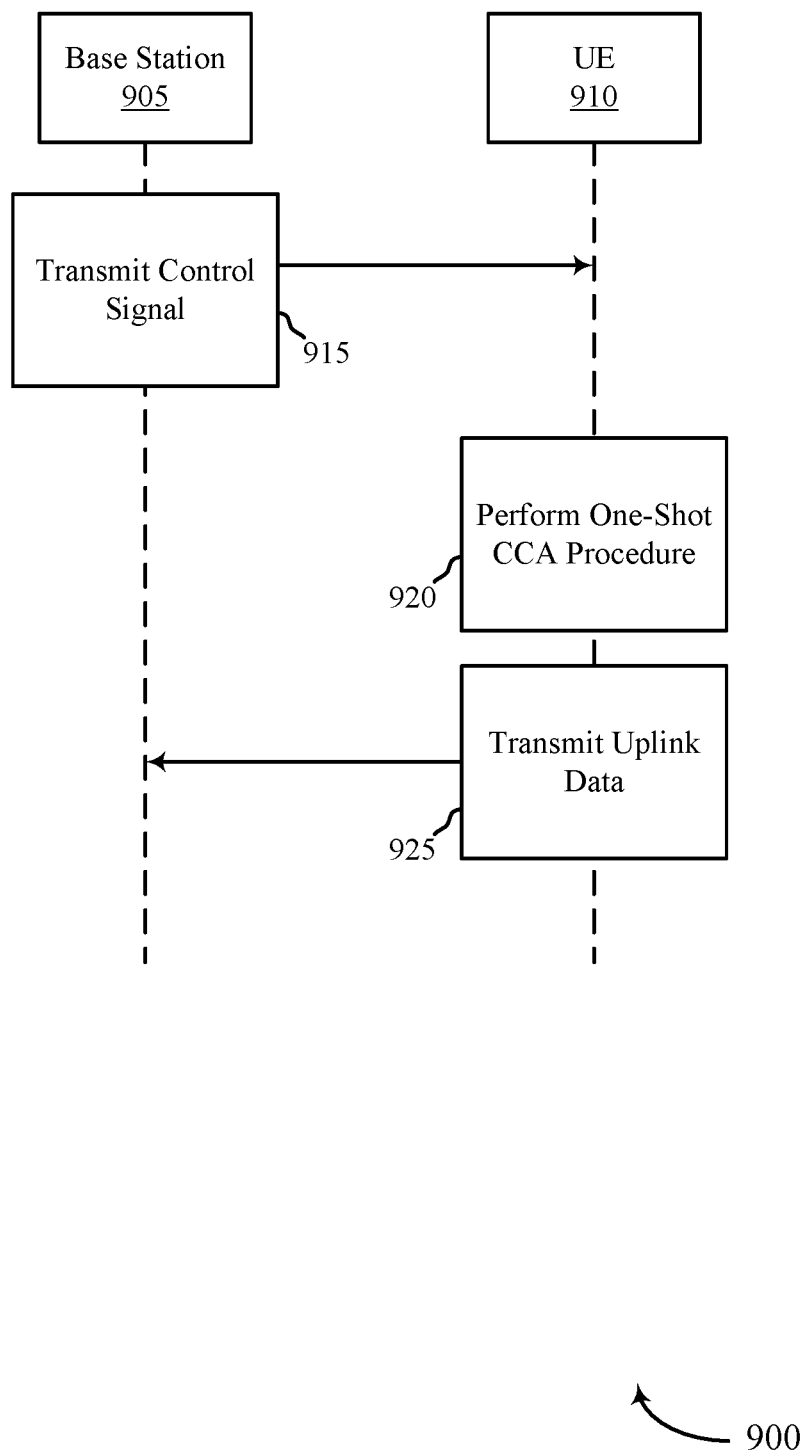
FIG. 9 illustrates an example of a process that supports eCCA for shared radio frequency spectrum band in accordance with aspects of the present disclosure.

FIG. 9 illustrates an example of a process 900 that supports eCCA for shared radio frequency spectrum band in accordance with aspects of the present disclosure. In some examples, process 900 may implement aspects of wireless communication system 100 and/or medium reservation schemes 300/400/500/600. Aspects of a process 900 may be implement a by a base station at 905 and/or UE 910, which may be examples of the corresponding devices described herein.

At 915, base station 905 may transmit (and UE 910 may receive) a control signal indicating that base station 905 as obtain access to a shared radio frequency spectrum band. In some aspects, the control signal may include or otherwise convey an indication of a grant for the uplink transmission.

At 920, UE 910 may perform, based at least in part on the grant, a one-shot CCA procedure on the shared radio frequency spectrum band at a beginning of a time period corresponding to the uplink transmission. In some aspects, base station 105 may transmit (and UE 910 may receive) a filler signal from an end of the control signal to the scheduled beginning of the time period corresponding to the uplink transmission.

In some aspects, UE 910 may determine that the one-shot CCA procedure was unsuccessful (e.g., UE 910 may detect an energy level or one or more messages exchanged on the channel indicating that the channel is occupied). In some aspects and based on the unsuccessful one-shot CCA procedure, UE 710 may perform a second one-shot CCA procedure on the shared radio frequency spectrum band at the beginning of a second time period configured for the uplink transmission. In other aspects and based on the unsuccessful one-shot CCA procedure, UE 710 may discard the grant.

At 925, UE 910 may transmit (and base station 905 may receive) the uplink transmission based at least in part on a result of the one-shot CCA procedure (e.g., based on the one-shot CCA procedure being successful).

Figure 10:
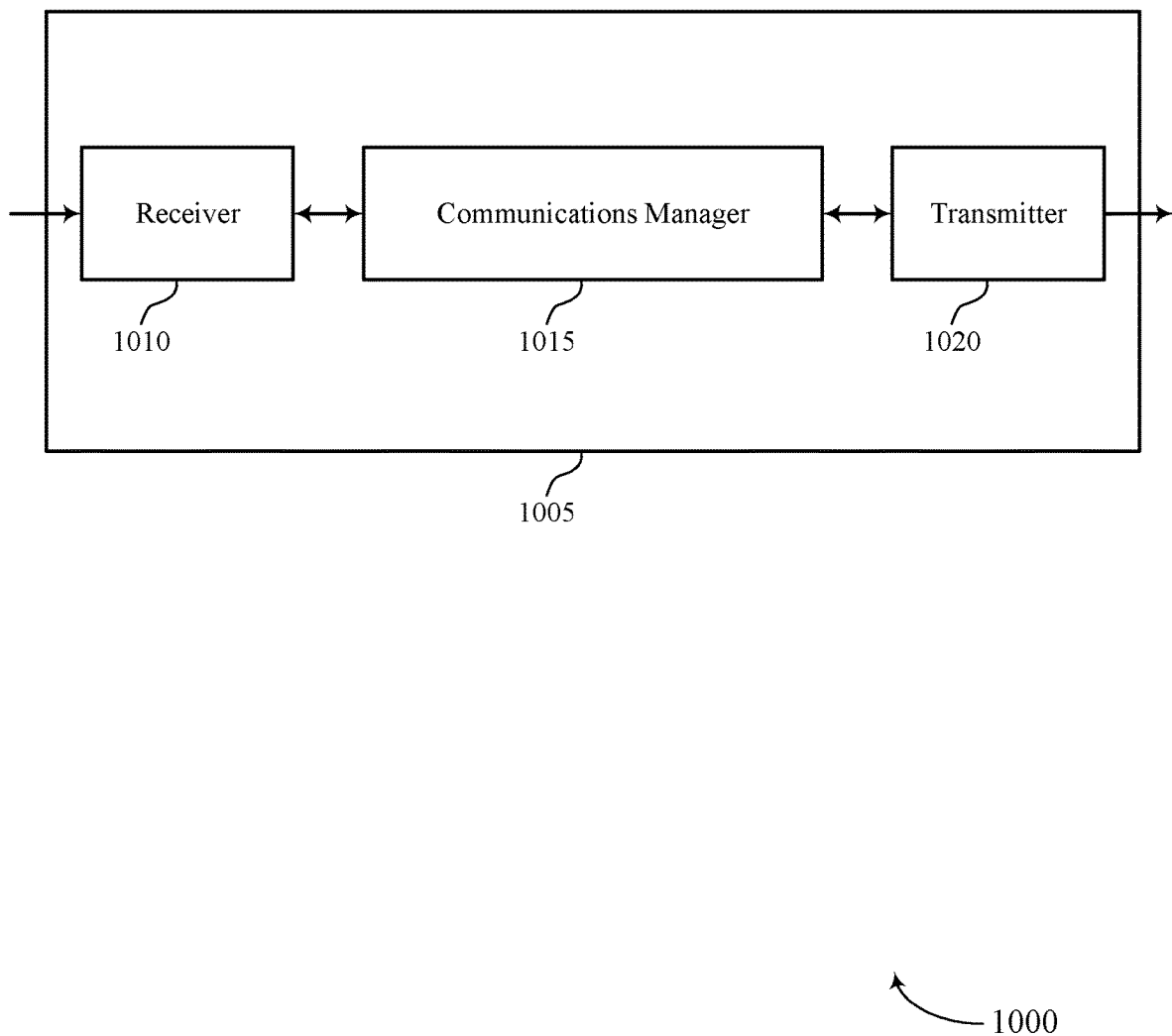
FIGS. 10 and 11 show block diagrams of devices that support eCCA for shared radio frequency spectrum band in accordance with aspects of the present disclosure.

FIG. 10 shows a block diagram 1000 of a device 1005 that supports eCCA for shared radio frequency spectrum band in accordance with aspects of the present disclosure. The device 1005 may be an example of aspects of a UE 115 as described herein. The device 1005 may include a receiver 1010, a communications manager 1015, and a transmitter 1020. The device 1005 may also include a processor. Each of these components may be in communication with one another (e.g., via one or more buses).

The receiver 1010 may receive information such as packets, user data, or control information associated with various information channels (e.g., control channels, data channels, and information related to eCCA for shared radio frequency spectrum band, etc.). Information may be passed on to other components of the device 1005. The receiver 1010 may be an example of aspects of the transceiver 1320 described with reference to FIG. 13. The receiver 1010 may utilize a single antenna or a set of antennas.

The communications manager 1015 may receive a control signal indicating that a base station has obtained access to a shared radio frequency spectrum band, the control signal including a grant for an uplink transmission, perform, based on the grant, a one-shot CCA procedure on the shared radio frequency spectrum band at a beginning of a time period corresponding to the uplink transmission, and perform, based on a result of the one-shot CCA procedure, the uplink transmission to the base station. The communications manager 1015 may be an example of aspects of the communications manager 1310 described herein.

The communications manager 1015, or its sub-components, may be implemented in hardware, code (e.g., software or firmware) executed by a processor, or any combination thereof. If implemented in code executed by a processor, the functions of the communications manager 1015, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1015, or its sub-components, may be physically located at various positions, including being distributed such that portions of functions are implemented at different physical locations by one or more physical components. In some examples, the communications manager 1015, or its sub-components, may be a separate and distinct component in accordance with various aspects of the present disclosure. In some examples, the communications manager 1015, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1020 may transmit signals generated by other components of the device 1005. In some examples, the transmitter 1020 may be collocated with a receiver 1010 in a transceiver module. For example, the transmitter 1020 may be an example of aspects of the transceiver 1320 described with reference to FIG. 13. The transmitter 1020 may utilize a single antenna or a set of antennas.

In some examples, communications manager 1015 may be implemented as an integrated circuit or chipset for a mobile device modem, and the receiver 1010 and transmitter 1020 may be implemented as analog components (e.g., amplifiers, filters, antennas, etc.) coupled with the mobile device modem to enable wireless transmission and reception.

The communications manager 1015 as described herein may be implemented to realize one or more potential advantages. Various implementations may enable eCCA for a shared radio frequency spectrum band. For example, techniques for energy detection CCA procedures may be implemented by communications manager 1015 located at transmitting or receiving devices, and may increase the efficiency of channel reservation and overall communications between such devices.

Based on implementing the channel reservation techniques as described herein, one or more processors of the device 1005 (e.g., processor(s) controlling or incorporated with one or more of receiver 1010, communications manager 1015, and transmitter 1020) may reduce an amount of time required to reserve a communications channel. In addition, only one device (e.g., a UE 115 or base station 105 as described herein) may perform channel sensing, instead of both devices, which may save power and decrease processing times at one or both devices.

Figure 11:
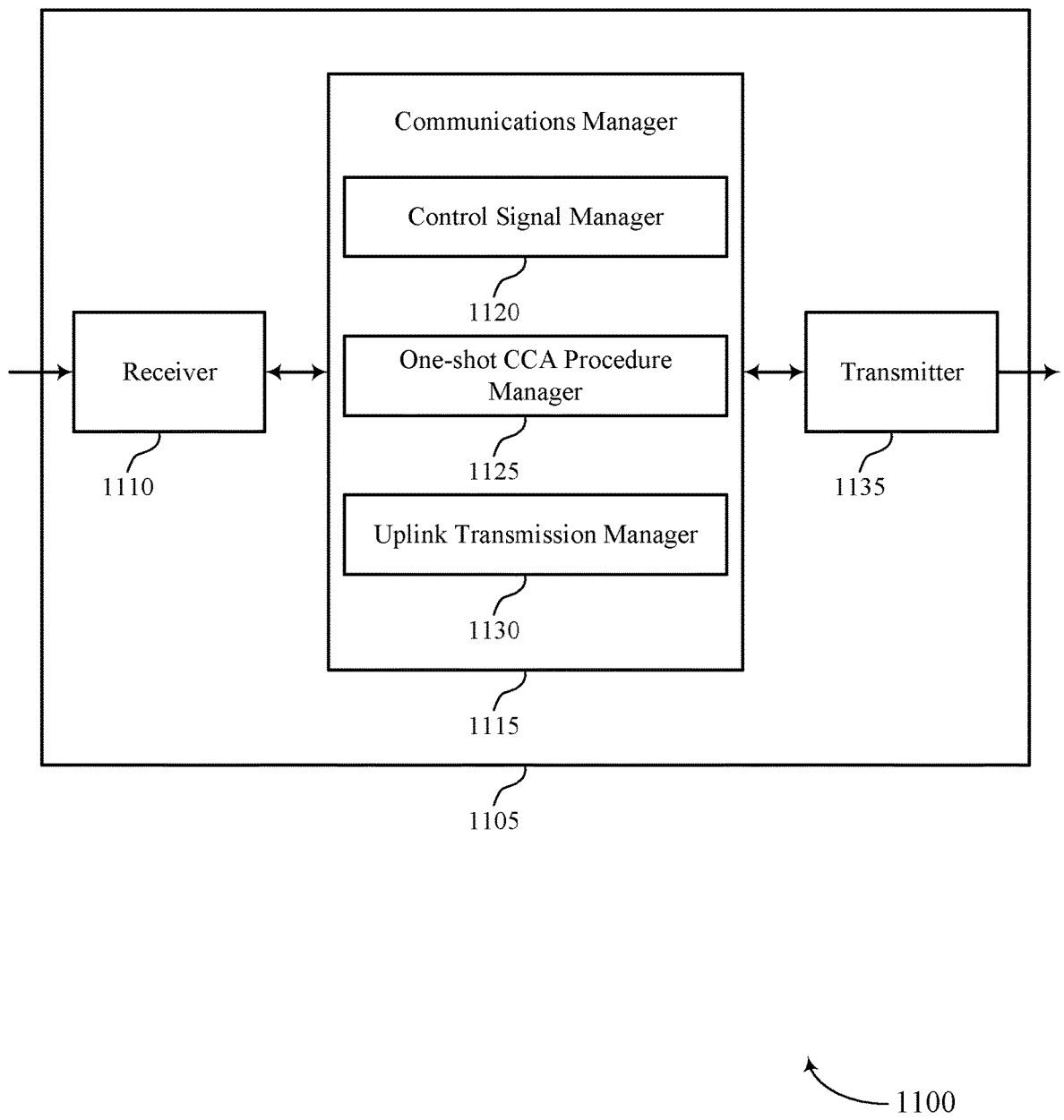

FIG. 11 shows a block diagram 1100 of a device 1105 that supports eCCA for shared radio frequency spectrum band in accordance with aspects of the present disclosure. The device 1105 may be an example of aspects of a device 1005 or a UE 115 as described herein. The device 1105 may include a receiver 1110, a communications manager 1115, and a transmitter 1135. The device 1105 may also include a processor. Each of these components may be in communication with one another (e.g., via one or more buses).

The receiver 1110 may receive information such as packets, user data, or control information associated with various information channels (e.g., control channels, data channels, and information related to eCCA for shared radio frequency spectrum band, etc.). Information may be passed on to other components of the device 1105. The receiver 1110 may be an example of aspects of the transceiver 1320 described with reference to FIG. 13. The receiver 1110 may utilize a single antenna or a set of antennas.

The communications manager 1115 may be an example of aspects of the communications manager 1015 as described herein. The communications manager 1115 may include a control signal manager 1120, an one-shot CCA procedure manager 1125, and an uplink transmission manager 1130. The communications manager 1115 may be an example of aspects of the communications manager 1310 described herein.

The control signal manager 1120 may receive a control signal indicating that a base station has obtained access to a shared radio frequency spectrum band, the control signal including a grant for an uplink transmission.

The one-shot CCA procedure manager 1125 may perform, based on the grant, a one-shot CCA procedure on the shared radio frequency spectrum band at a beginning of a time period corresponding to the uplink transmission.

The uplink transmission manager 1130 may perform, based on a result of the one-shot CCA procedure, the uplink transmission to the base station.

The transmitter 1135 may transmit signals generated by other components of the device 1105. In some examples, the transmitter 1135 may be collocated with a receiver 1110 in a transceiver module. For example, the transmitter 1135 may be an example of aspects of the transceiver 1320 described with reference to FIG. 13. The transmitter 1135 may utilize a single antenna or a set of antennas.

Figure 12:
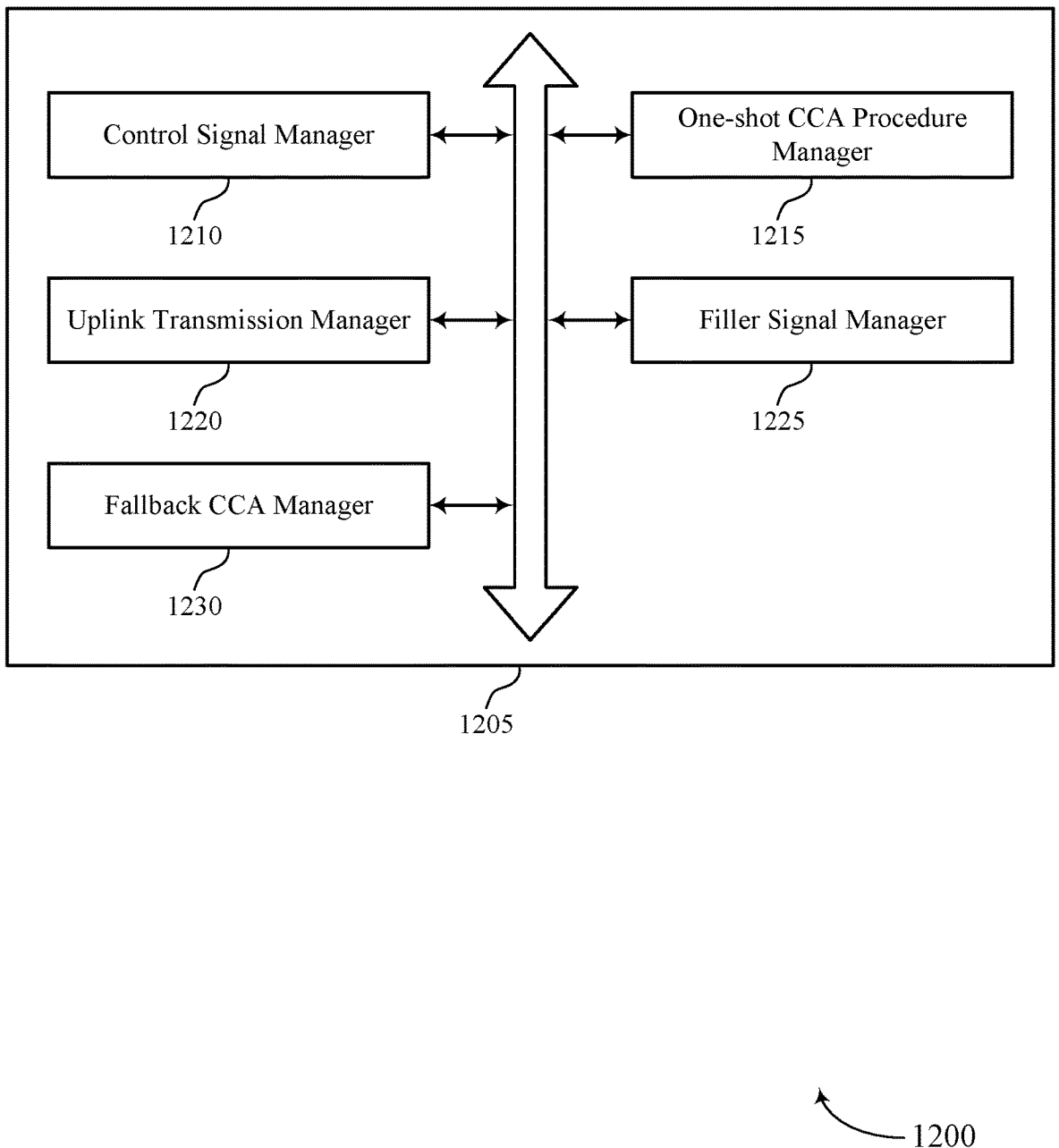
FIG. 12 shows a block diagram of a communications manager that supports eCCA for shared radio frequency spectrum band in accordance with aspects of the present disclosure.

FIG. 12 shows a block diagram 1200 of a communications manager 1205 that supports eCCA for shared radio frequency spectrum band in accordance with aspects of the present disclosure. The communications manager 1205 may be an example of aspects of a communications manager 1015, a communications manager 1115, or a communications manager 1310 described herein. The communications manager 1205 may include a control signal manager 1210, an one-shot CCA procedure manager 1215, an uplink transmission manager 1220, a filler signal manager 1225, and a fallback CCA manager 1230. Each of these modules may communicate, directly or indirectly, with one another (e.g., via one or more buses).

The control signal manager 1210 may receive a control signal indicating that a base station has obtained access to a shared radio frequency spectrum band, the control signal including a grant for an uplink transmission.

The one-shot CCA procedure manager 1215 may perform, based on the grant, a one-shot CCA procedure on the shared radio frequency spectrum band at a beginning of a time period corresponding to the uplink transmission.

The uplink transmission manager 1220 may perform, based on a result of the one-shot CCA procedure, the uplink transmission to the base station.

The filler signal manager 1225 may receive a filler signal transmitted by the base station from an end of the control signal to the scheduled beginning of the time period.

The fallback CCA manager 1230 may determine that the one-shot CCA procedure was unsuccessful.

In some examples, the fallback CCA manager 1230 may perform a second one-shot CCA procedure on the shared radio frequency spectrum band at a beginning of a second time period configured for the uplink transmission.

In some examples, the fallback CCA manager 1230 may discard the grant.

Figure 13:
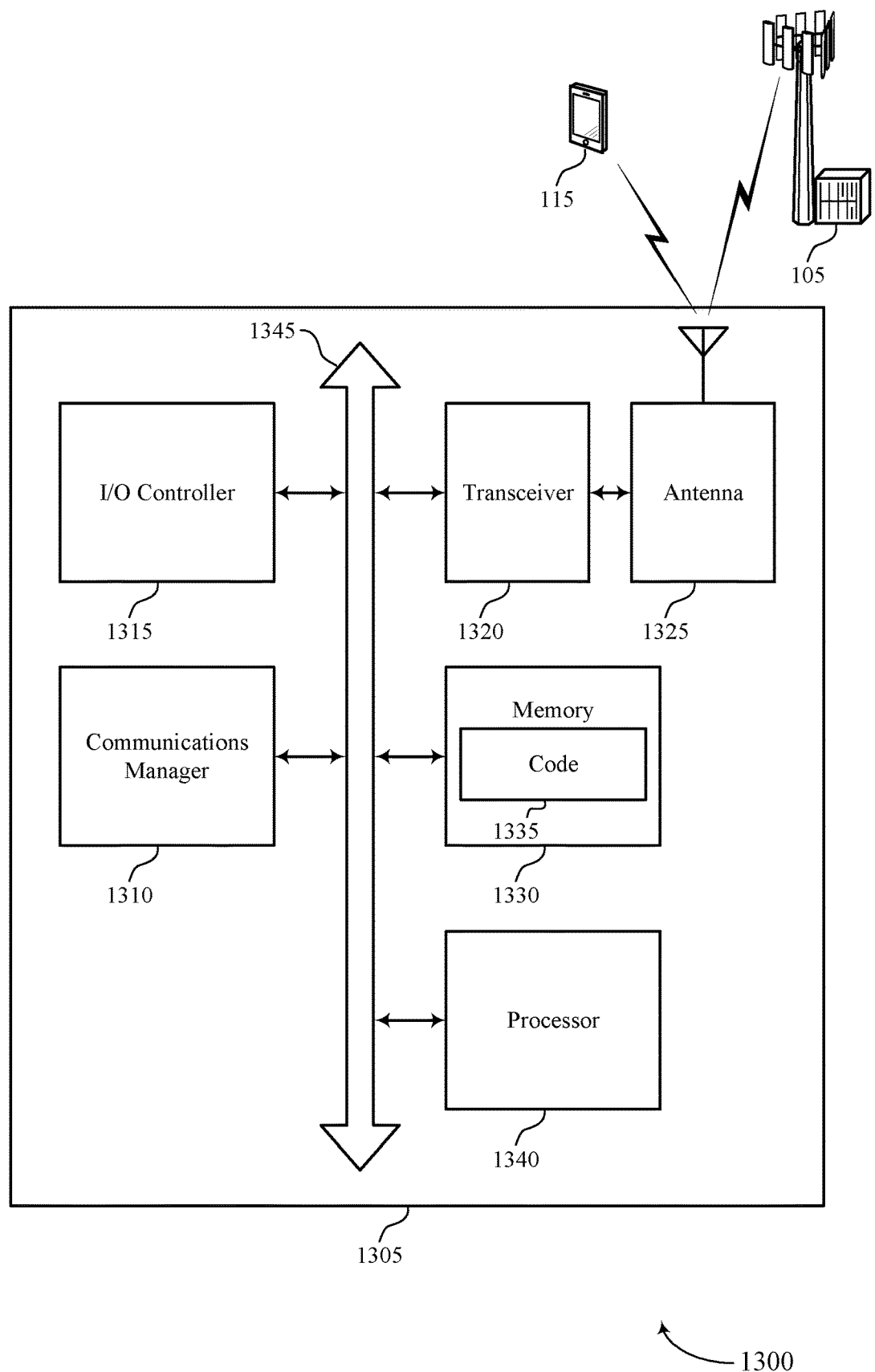
FIG. 13 shows a diagram of a system including a device that supports eCCA for shared radio frequency spectrum band in accordance with aspects of the present disclosure.

FIG. 13 shows a diagram of a system 1300 including a device 1305 that supports eCCA for shared radio frequency spectrum band in accordance with aspects of the present disclosure. The device 1305 may be an example of or include the components of device 1005, device 1105, or a UE 115 as described herein. The device 1305 may include components for bi-directional voice and data communications including components for transmitting and receiving communications, including a communications manager 1310, an I/O controller 1315, a transceiver 1320, an antenna 1325, memory 1330, and a processor 1340. These components may be in electronic communication via one or more buses (e.g., bus 1345).

The communications manager 1310 may receive a control signal indicating that a base station has obtained access to a shared radio frequency spectrum band, the control signal including a grant for an uplink transmission, perform, based on the grant, a one-shot CCA procedure on the shared radio frequency spectrum band at a beginning of a time period corresponding to the uplink transmission, and perform, based on a result of the one-shot CCA procedure, the uplink transmission to the base station.

The I/O controller 1315 may manage input and output signals for the device 1305. The I/O controller 1315 may also manage peripherals not integrated into the device 1305.

In some cases, the I/O controller 1315 may represent a physical connection or port to an external peripheral. In some cases, the I/O controller 1315 may utilize an operating system such as iOS®, ANDROID®, MS-DOS®, MS-WINDOWS®, OS/2®, UNIX®, LINUX®, or another known operating system. In other cases, the I/O controller 1315 may represent or interact with a modem, a keyboard, a mouse, a touchscreen, or a similar device. In some cases, the I/O controller 1315 may be implemented as part of a processor. In some cases, a user may interact with the device 1305 via the I/O controller 1315 or via hardware components controlled by the I/O controller 1315.

The transceiver 1320 may communicate bi-directionally, via one or more antennas, wired, or wireless links as described herein. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas.

In some cases, the wireless device may include a single antenna 1325. However, in some cases the device may have more than one antenna 1325, which may be capable of concurrently transmitting or receiving multiple wireless transmissions.

The memory 1330 may include RAM and ROM. The memory 1330 may store computer-readable, computer-executable code 1335 including instructions that, when executed, cause the processor to perform various functions described herein. In some cases, the memory 1330 may contain, among other things, a BIOS which may control basic hardware or software operation such as the interaction with peripheral components or devices.

The processor 1340 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In other cases, a memory controller may be integrated into the processor 1340. The processor 1340 may be configured to execute computer-readable instructions stored in a memory (e.g., the memory 1330) to cause the device 1305 to perform various functions (e.g., functions or tasks supporting eCCA for shared radio frequency spectrum band).

The code 1335 may include instructions to implement aspects of the present disclosure, including instructions to support wireless communications. The code 1335 may be stored in a non-transitory computer-readable medium such as system memory or other type of memory. In some cases, the code 1335 may not be directly executable by the processor 1340 but may cause a computer (e.g., when compiled and executed) to perform functions described herein.

Figure 14:
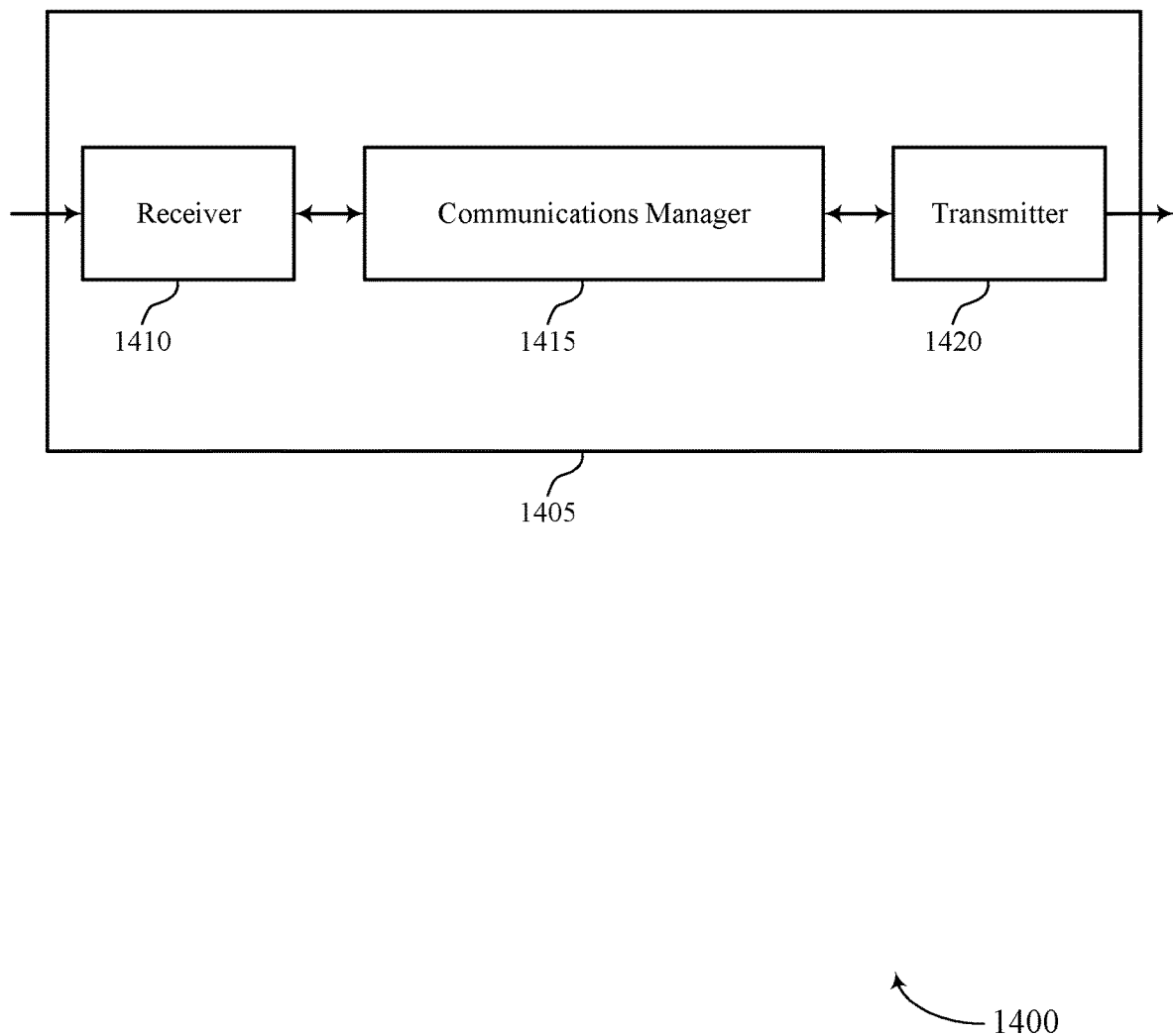
FIGS. 14 and 15 show block diagrams of devices that support eCCA for shared radio frequency spectrum band in accordance with aspects of the present disclosure.

FIG. 14 shows a block diagram 1400 of a device 1405 that supports eCCA for shared radio frequency spectrum band in accordance with aspects of the present disclosure. The device 1405 may be an example of aspects of a base station 105 as described herein. The device 1405 may include a receiver 1410, a communications manager 1415, and a transmitter 1420. The device 1405 may also include a processor. Each of these components may be in communication with one another (e.g., via one or more buses).

The receiver 1410 may receive information such as packets, user data, or control information associated with various information channels (e.g., control channels, data channels, and information related to eCCA for shared radio frequency spectrum band, etc.). Information may be passed on to other components of the device 1405. The receiver 1410 may be an example of aspects of the transceiver 1720 described with reference to FIG. 17. The receiver 1410 may utilize a single antenna or a set of antennas.

The communications manager 1415 may transmit to a UE a control signal including a grant for a downlink transmission, perform, during a gap between the control signal and the downlink transmission, a CCA procedure on a shared radio frequency spectrum band associated with the downlink transmission, and perform, based on a success of the CCA procedure, the downlink transmission to the UE over the shared radio frequency spectrum band. The communications manager 1415 may also perform an extended CCA procedure to obtain access to a shared radio frequency spectrum band for a transmission opportunity, perform a one-shot CCA procedure on the shared radio frequency spectrum based on a scheduled second downlink transmission to a second UE within the transmission opportunity, perform, based on a result of the extended CCA procedure, a first downlink transmission to a first UE over the shared radio frequency spectrum band, and perform, based on a result of the one-shot CCA procedure, the second downlink transmission to the second UE over the shared radio frequency spectrum band. The communications manager 1415 may be an example of aspects of the communications manager 1710 described herein.

The communications manager 1415, or its sub-components, may be implemented in hardware, code (e.g., software or firmware) executed by a processor, or any combination thereof. If implemented in code executed by a processor, the functions of the communications manager 1415, or its sub-components may be executed by a general-purpose processor, a DSP, an ASIC, a FPGA or other programmable logic device, discrete gate or transistor logic, discrete hardware components, or any combination thereof designed to perform the functions described in the present disclosure.

The communications manager 1415, or its sub-components, may be physically located at various positions, including being distributed such that portions of functions are implemented at different physical locations by one or more physical components. In some examples, the communications manager 1415, or its sub-components, may be a separate and distinct component in accordance with various aspects of the present disclosure. In some examples, the communications manager 1415, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1420 may transmit signals generated by other components of the device 1405. In some examples, the transmitter 1420 may be collocated with a receiver 1410 in a transceiver module. For example, the transmitter 1420 may be an example of aspects of the transceiver 1720 described with reference to FIG. 17. The transmitter 1420 may utilize a single antenna or a set of antennas.

Figure 15:
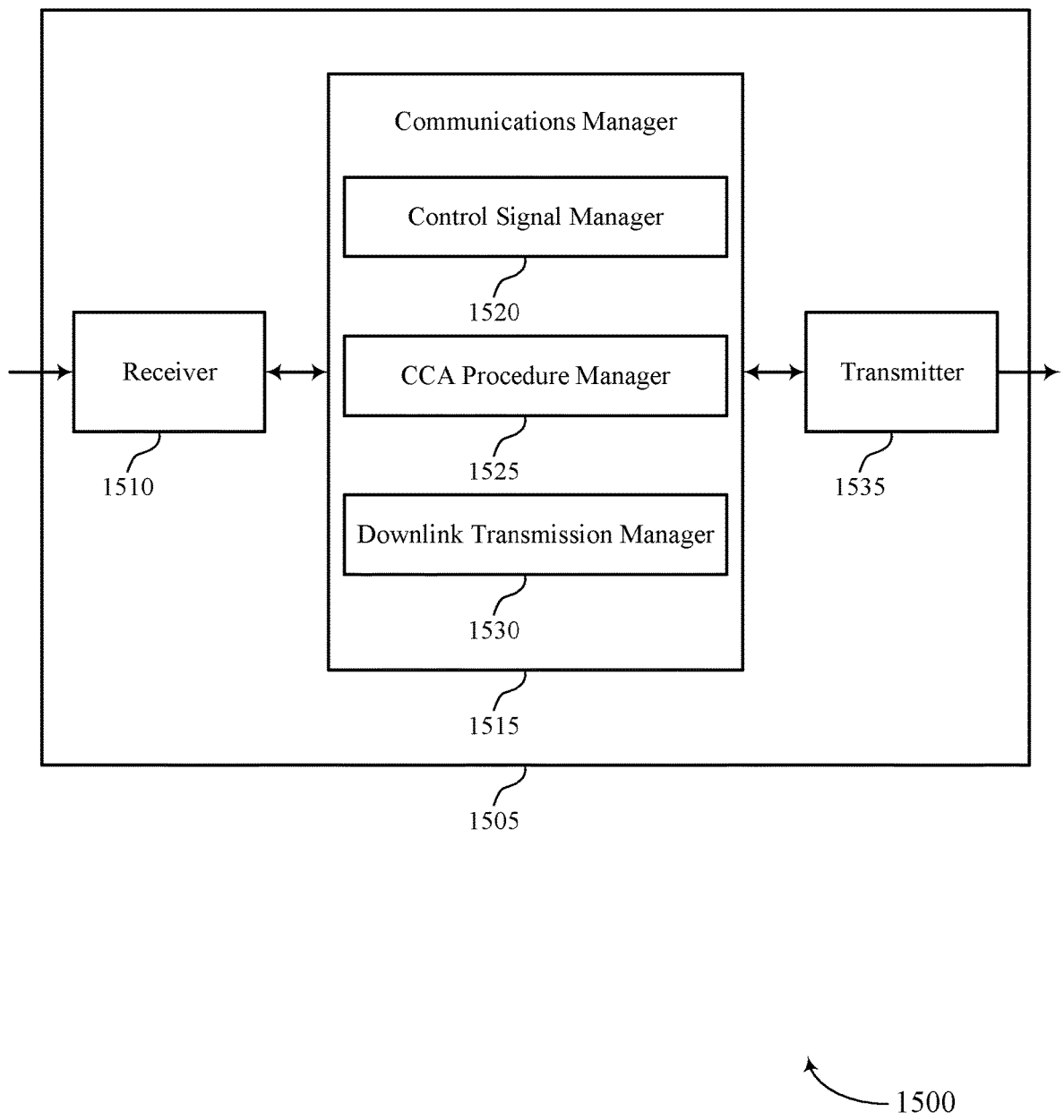

FIG. 15 shows a block diagram 1500 of a device 1505 that supports eCCA for shared radio frequency spectrum band in accordance with aspects of the present disclosure. The device 1505 may be an example of aspects of a device 1405 or a base station 105 as described herein. The device 1505 may include a receiver 1510, a communications manager 1515, and a transmitter 1535. The device 1505 may also include a processor. Each of these components may be in communication with one another (e.g., via one or more buses).

The receiver 1510 may receive information such as packets, user data, or control information associated with various information channels (e.g., control channels, data channels, and information related to eCCA for shared radio frequency spectrum band, etc.). Information may be passed on to other components of the device 1505. The receiver 1510 may be an example of aspects of the transceiver 1720 described with reference to FIG. 17. The receiver 1510 may utilize a single antenna or a set of antennas.

The communications manager 1515 may be an example of aspects of the communications manager 1415 as described herein. The communications manager 1515 may include a control signal manager 1520, a CCA procedure manager 1525, and a downlink transmission manager 1530. The communications manager 1515 may be an example of aspects of the communications manager 1710 described herein.

The control signal manager 1520 may transmit to a UE a control signal including a grant for a downlink transmission.

The CCA procedure manager 1525 may perform, during a gap between the control signal and the downlink transmission, a CCA procedure on a shared radio frequency spectrum band associated with the downlink transmission.

The downlink transmission manager 1530 may perform, based on a success of the CCA procedure, the downlink transmission to the UE over the shared radio frequency spectrum band.

The CCA procedure manager 1525 may perform an extended CCA procedure to obtain access to a shared radio frequency spectrum band for a transmission opportunity and perform a one-shot CCA procedure on the shared radio frequency spectrum based on a scheduled second downlink transmission to a second UE within the transmission opportunity.

The downlink transmission manager 1530 may perform, based on a result of the extended CCA procedure, a first downlink transmission to a first UE over the shared radio frequency spectrum band and perform, based on a result of the one-shot CCA procedure, the second downlink transmission to the second UE over the shared radio frequency spectrum band.

The transmitter 1535 may transmit signals generated by other components of the device 1505. In some examples, the transmitter 1535 may be collocated with a receiver 1510 in a transceiver module. For example, the transmitter 1535 may be an example of aspects of the transceiver 1720 described with reference to FIG. 17. The transmitter 1535 may utilize a single antenna or a set of antennas.

Figure 16:
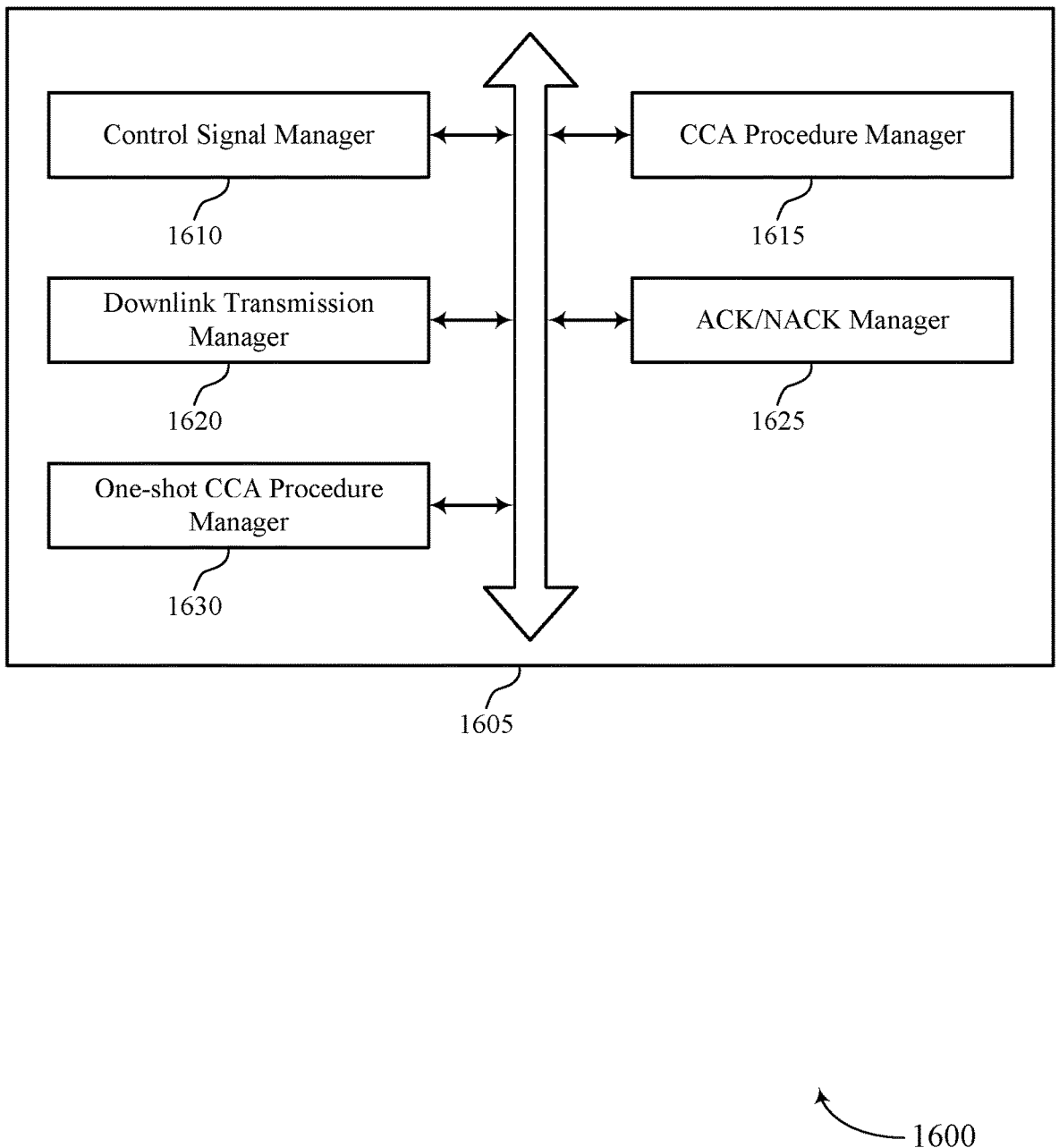
FIG. 16 shows a block diagram of a communications manager that supports eCCA for shared radio frequency spectrum band in accordance with aspects of the present disclosure.

FIG. 16 shows a block diagram 1600 of a communications manager 1605 that supports eCCA for shared radio frequency spectrum band in accordance with aspects of the present disclosure. The communications manager 1605 may be an example of aspects of a communications manager 1415, a communications manager 1515, or a communications manager 1710 described herein. The communications manager 1605 may include a control signal manager 1610, a CCA procedure manager 1615, a downlink transmission manager 1620, an ACK/NACK manager 1625, and an one-shot CCA procedure manager 1630. Each of these modules may communicate, directly or indirectly, with one another (e.g., via one or more buses).

The control signal manager 1610 may transmit to a UE a control signal including a grant for a downlink transmission.

The CCA procedure manager 1615 may perform, during a gap between the control signal and the downlink transmission, a CCA procedure on a shared radio frequency spectrum band associated with the downlink transmission.

In some examples, the CCA procedure manager 1615 may perform an extended CCA procedure to obtain access to a shared radio frequency spectrum band for a transmission opportunity.

In some examples, the CCA procedure manager 1615 may perform a one-shot CCA procedure on the shared radio frequency spectrum based on a scheduled second downlink transmission to a second UE within the transmission opportunity. In some cases, the CCA procedure includes at least one of an omni-directional CCA procedure or a directional CCA procedure. In some cases, the CCA procedure includes at least one of an extended CCA procedure or a one-shot CCA procedure. In some cases, the CCA procedure includes a category 2 LBT procedure. In some cases, the extended CCA procedure includes an omni-directional CCA procedure or a directional CCA procedure.

The downlink transmission manager 1620 may perform, based on a success of the CCA procedure, the downlink transmission to the UE over the shared radio frequency spectrum band. In some examples, the downlink transmission manager 1620 may perform, based on a result of the extended CCA procedure, a first downlink transmission to a first UE over the shared radio frequency spectrum band.

In some examples, the downlink transmission manager 1620 may perform, based on a result of the one-shot CCA procedure, the second downlink transmission to the second UE over the shared radio frequency spectrum band. The ACK/NACK manager 1625 may receive an acknowledgement message for the downlink transmission during a CCA-free acknowledgment period following the downlink transmission.

In some examples, the ACK/NACK manager 1625 may receive a first acknowledgment message from the first UE for the first downlink transmission during a first CCA-free acknowledgment period following the first downlink transmission. In some examples, the ACK/NACK manager 1625 may receive a second acknowledgment message from the second UE for the second downlink transmission during a second CCA-free acknowledgment period following the second downlink transmission.

The one-shot CCA procedure manager 1630 may perform, before transmitting the control signal, a one-shot CCA procedure on the shared radio frequency spectrum band based on the downlink transmission.

Figure 17:
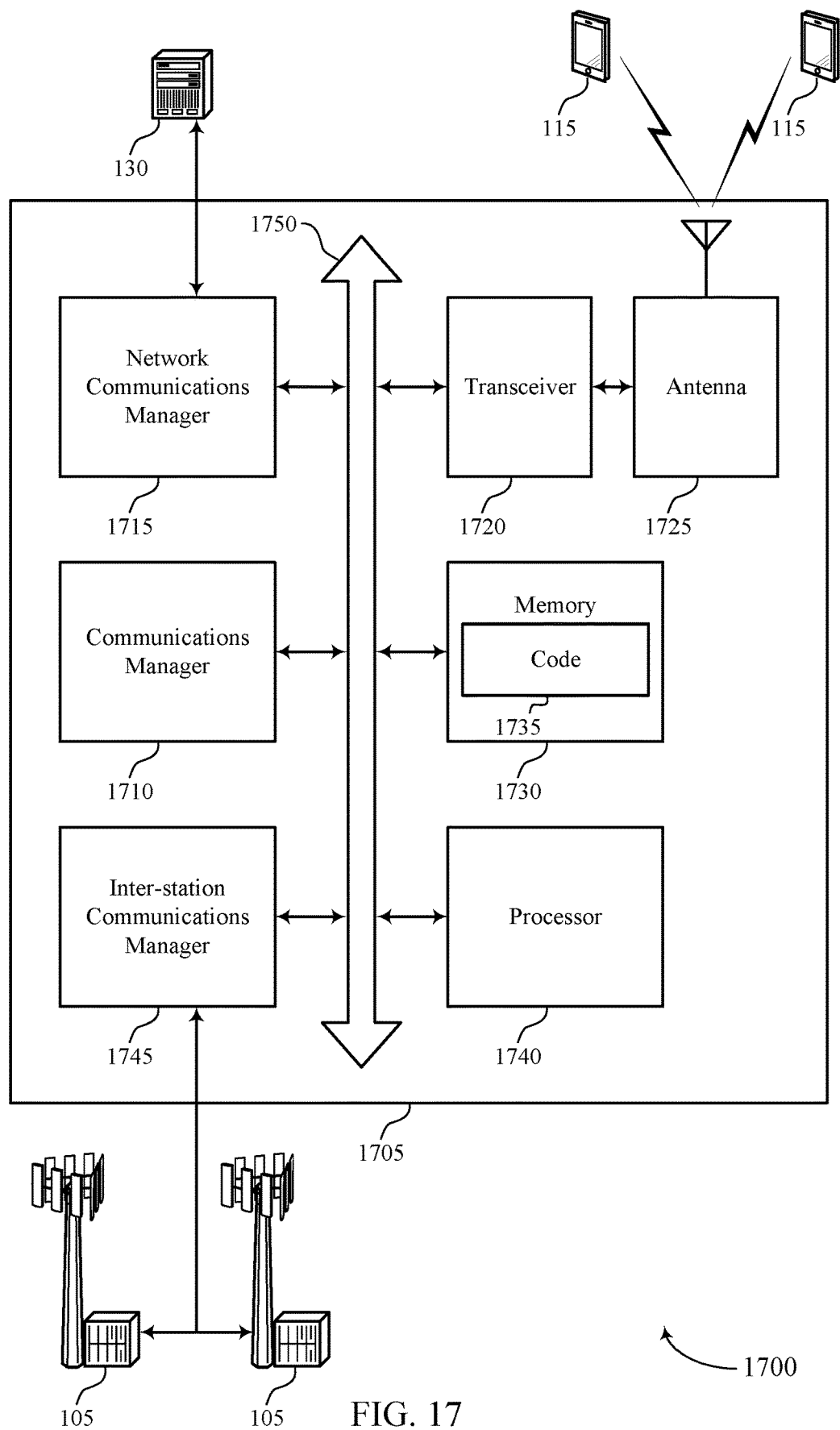
FIG. 17 shows a diagram of a system including a device that supports eCCA for shared radio frequency spectrum band in accordance with aspects of the present disclosure.

FIG. 17 shows a diagram of a system 1700 including a device 1705 that supports eCCA for shared radio frequency spectrum band in accordance with aspects of the present disclosure. The device 1705 may be an example of or include the components of device 1405, device 1505, or a base station 105 as described herein. The device 1705 may include components for bi-directional voice and data communications including components for transmitting and receiving communications, including a communications manager 1710, a network communications manager 1715, a transceiver 1720, an antenna 1725, memory 1730, a processor 1740, and an inter-station communications manager 1745. These components may be in electronic communication via one or more buses (e.g., bus 1750).

The communications manager 1710 may transmit to a UE a control signal including a grant for a downlink transmission, perform, during a gap between the control signal and the downlink transmission, a CCA procedure on a shared radio frequency spectrum band associated with the downlink transmission, and perform, based on a success of the CCA procedure, the downlink transmission to the UE over the shared radio frequency spectrum band. The communications manager 1710 may also perform an extended CCA procedure to obtain access to a shared radio frequency spectrum band for a transmission opportunity, perform a one-shot CCA procedure on the shared radio frequency spectrum based on a scheduled second downlink transmission to a second UE within the transmission opportunity, perform, based on a result of the extended CCA procedure, a first downlink transmission to a first UE over the shared radio frequency spectrum band, and perform, based on a result of the one-shot CCA procedure, the second downlink transmission to the second UE over the shared radio frequency spectrum band.

The network communications manager 1715 may manage communications with the core network (e.g., via one or more wired backhaul links). For example, the network communications manager 1715 may manage the transfer of data communications for client devices, such as one or more UEs 115.

The transceiver 1720 may communicate bi-directionally, via one or more antennas, wired, or wireless links as described herein. For example, the transceiver 1720 may represent a wireless transceiver and may communicate bi-directionally with another wireless transceiver. The transceiver 1720 may also include a modem to modulate the packets and provide the modulated packets to the antennas for transmission, and to demodulate packets received from the antennas.

In some cases, the wireless device may include a single antenna 1725. However, in some cases the device may have more than one antenna 1725, which may be capable of concurrently transmitting or receiving multiple wireless transmissions.

The memory 1730 may include RAM, ROM, or a combination thereof. The memory 1730 may store computer-readable code 1735 including instructions that, when executed by a processor (e.g., the processor 1740) cause the device to perform various functions described herein. In some cases, the memory 1730 may contain, among other things, a BIOS which may control basic hardware or software operation such as the interaction with peripheral components or devices.

The processor 1740 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1740 may be configured to operate a memory array using a memory controller. In some cases, a memory controller may be integrated into processor 1740. The processor 1740 may be configured to execute computer-readable instructions stored in a memory (e.g., the memory 1730) to cause the device to perform various functions (e.g., functions or tasks supporting eCCA for shared radio frequency spectrum band).

The inter-station communications manager 1745 may manage communications with other base station 105, and may include a controller or scheduler for controlling communications with UEs 115 in cooperation with other base stations 105. For example, the inter-station communications manager 1745 may coordinate scheduling for transmissions to UEs 115 for various interference mitigation techniques such as beamforming or joint transmission. In some examples, the inter-station communications manager 1745 may provide an X2 interface within an LTE/LTE-A wireless communication network technology to provide communication between base stations 105.

The code 1735 may include instructions to implement aspects of the present disclosure, including instructions to support wireless communications. The code 1735 may be stored in a non-transitory computer-readable medium such as system memory or other type of memory. In some cases, the code 1735 may not be directly executable by the processor 1740 but may cause a computer (e.g., when compiled and executed) to perform functions described herein.

Figure 18:
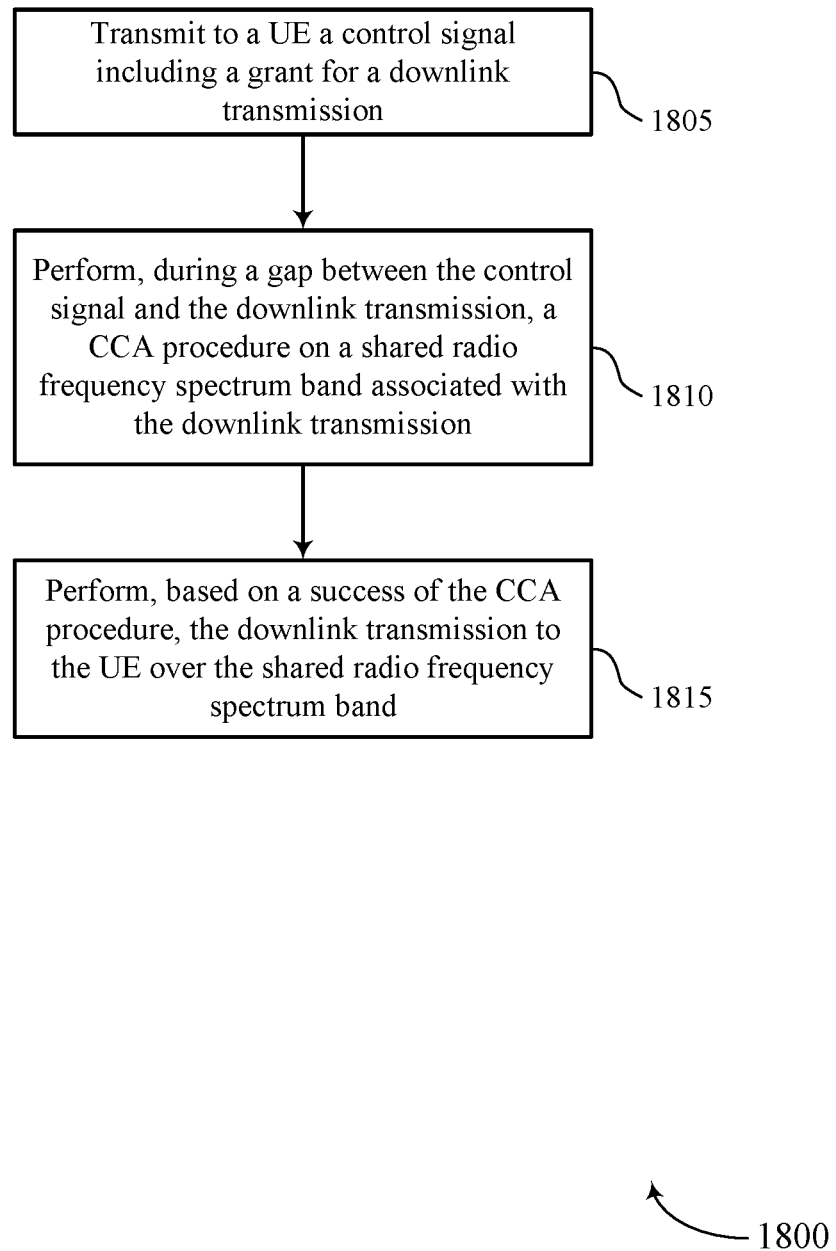
FIGS. 18 through 20 show flowcharts illustrating methods that support eCCA for shared radio frequency spectrum band in accordance with aspects of the present disclosure.

FIG. 18 shows a flowchart illustrating a method 1800 that supports eCCA for shared radio frequency spectrum band in accordance with aspects of the present disclosure. The operations of method 1800 may be implemented by a base station 105 or its components as described herein. For example, the operations of method 1800 may be performed by a communications manager as described with reference to FIGS. 14 through 17. In some examples, a base station may execute a set of instructions to control the functional elements of the base station to perform the functions described herein. Additionally, or alternatively, a base station may perform aspects of the functions described herein using special-purpose hardware.

At 1805, the base station may transmit to a UE a control signal including a grant for a downlink transmission. The operations of 1805 may be performed according to the methods described herein. In some examples, aspects of the operations of 1805 may be performed by a control signal manager as described with reference to FIGS. 14 through 17.

At 1810, the base station may perform, during a gap between the control signal and the downlink transmission, a CCA procedure on a shared radio frequency spectrum band associated with the downlink transmission. The operations of 1810 may be performed according to the methods described herein. In some examples, aspects of the operations of 1810 may be performed by a CCA procedure manager as described with reference to FIGS. 14 through 17.

At 1815, the base station may perform, based on a success of the CCA procedure, the downlink transmission to the UE over the shared radio frequency spectrum band. The operations of 1815 may be performed according to the methods described herein. In some examples, aspects of the operations of 1815 may be performed by a downlink transmission manager as described with reference to FIGS. 14 through 17.

Figure 19:
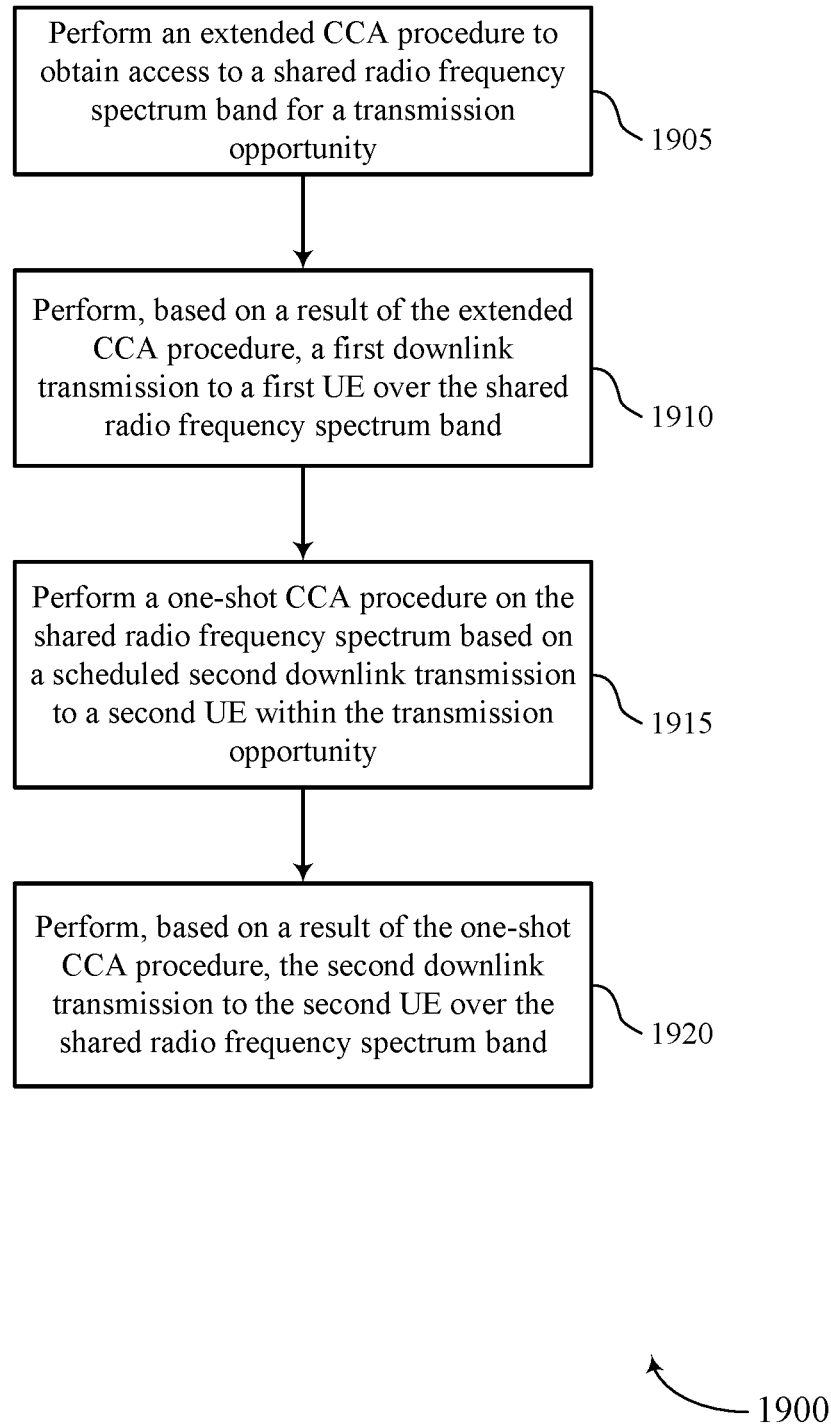

FIG. 19 shows a flowchart illustrating a method 1900 that supports eCCA for shared radio frequency spectrum band in accordance with aspects of the present disclosure. The operations of method 1900 may be implemented by a base station 105 or its components as described herein. For example, the operations of method 1900 may be performed by a communications manager as described with reference to FIGS. 14 through 17. In some examples, a base station may execute a set of instructions to control the functional elements of the base station to perform the functions described herein. Additionally, or alternatively, a base station may perform aspects of the functions described herein using special-purpose hardware.

At 1905, the base station may perform an extended CCA procedure to obtain access to a shared radio frequency spectrum band for a transmission opportunity. The operations of 1905 may be performed according to the methods described herein. In some examples, aspects of the operations of 1905 may be performed by a CCA procedure manager as described with reference to FIGS. 14 through 17.

At 1910, the base station may perform, based on a result of the extended CCA procedure, a first downlink transmission to a first UE over the shared radio frequency spectrum band. The operations of 1910 may be performed according to the methods described herein. In some examples, aspects of the operations of 1910 may be performed by a downlink transmission manager as described with reference to FIGS. 14 through 17.

At 1915, the base station may perform a one-shot CCA procedure on the shared radio frequency spectrum based on a scheduled second downlink transmission to a second UE within the transmission opportunity. The operations of 1915 may be performed according to the methods described herein. In some examples, aspects of the operations of 1915 may be performed by a CCA procedure manager as described with reference to FIGS. 14 through 17.

At 1920, the base station may perform, based on a result of the one-shot CCA procedure, the second downlink transmission to the second UE over the shared radio frequency spectrum band. The operations of 1920 may be performed according to the methods described herein. In some examples, aspects of the operations of 1920 may be performed by a downlink transmission manager as described with reference to FIGS. 14 through 17.

Figure 20:
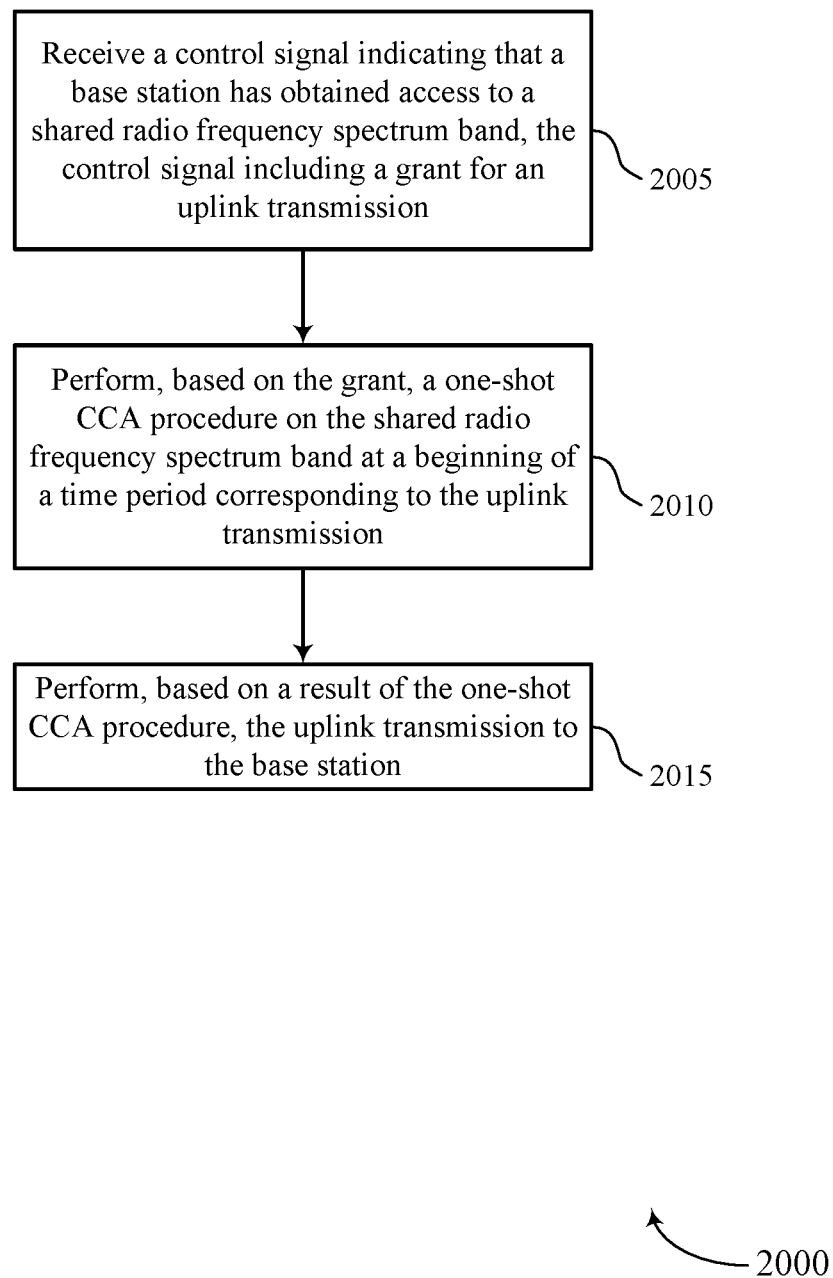

FIG. 20 shows a flowchart illustrating a method 2000 that supports eCCA for shared radio frequency spectrum band in accordance with aspects of the present disclosure. The operations of method 2000 may be implemented by a UE 115 or its components as described herein. For example, the operations of method 2000 may be performed by a communications manager as described with reference to FIGS. 10 through 13. In some examples, a UE may execute a set of instructions to control the functional elements of the UE to perform the functions described herein. Additionally, or alternatively, a UE may perform aspects of the functions described herein using special-purpose hardware.

At 2005, the UE may receive a control signal indicating that a base station has obtained access to a shared radio frequency spectrum band, the control signal including a grant for an uplink transmission. The operations of 2005 may be performed according to the methods described herein. In some examples, aspects of the operations of 2005 may be performed by a control signal manager as described with reference to FIGS. 10 through 13.

At 2010, the UE may perform, based on the grant, a one-shot CCA procedure on the shared radio frequency spectrum band at a beginning of a time period corresponding to the uplink transmission. The operations of 2010 may be performed according to the methods described herein. In some examples, aspects of the operations of 2010 may be performed by a one-shot CCA procedure manager as described with reference to FIGS. 10 through 13.

At 2015, the UE may perform, based on a result of the one-shot CCA procedure, the uplink transmission to the base station. The operations of 2015 may be performed according to the methods described herein. In some examples, aspects of the operations of 2015 may be performed by an uplink transmission manager as described with reference to FIGS. 10 through 13.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC- FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations herein are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a network device, comprising:
    transmitting, to a user equipment (UE), a control message comprising a grant for a downlink transmission;
    performing, during a gap that extends from an end of the control message to a beginning of the downlink transmission, a clear channel assessment (CCA) procedure that fully occupies the gap on a shared radio frequency spectrum band associated with the downlink transmission; and
    performing, in accordance with a success of the CCA procedure, the downlink transmission to the UE over the shared radio frequency spectrum band.

2. The method of claim 1, further comprising:
    receiving an acknowledgment message for the downlink transmission during a CCA-free acknowledgment period following the downlink transmission.

3. The method of claim 1, further comprising:
    performing, before transmitting the control message, a one-shot CCA procedure on the shared radio frequency spectrum band in accordance with the downlink transmission.

4. The method of claim 1, wherein the CCA procedure comprises at least one of an omni-directional CCA procedure or a directional CCA procedure.

5. The method of claim 1, wherein the CCA procedure comprises at least one of an extended CCA procedure or a one-shot CCA procedure.

6. The method of claim 1, wherein the CCA procedure comprises a category 2 listen-before-talk (LBT) procedure.

7. The method of claim 1, further comprising:
    performing the CCA procedure and the downlink transmission at a boundary of a slot.

8. A method for wireless communication at a network device, comprising:
    performing an extended clear channel assessment (CCA) procedure to obtain access to a shared radio frequency spectrum band for a downlink transmission opportunity;
    performing, in accordance with a result of the extended CCA procedure, a first downlink transmission to a first UE over the shared radio frequency spectrum band, the first downlink transmission including a first downlink control channel and a first downlink data channel for the first UE;
    performing a one-shot CCA procedure on the shared radio frequency spectrum band in accordance with a scheduled second downlink transmission to a second UE within the downlink transmission opportunity; and
    performing, in accordance with a result of the one-shot CCA procedure, the scheduled second downlink transmission to the second UE over the shared radio frequency spectrum band, the scheduled second downlink transmission comprising a second downlink control channel and a second downlink data channel for the second UE.

9. The method of claim 8, further comprising:
    receiving a first acknowledgment message from the first UE for the first downlink transmission during a first CCA-free acknowledgment period following the first downlink transmission.

10. The method of claim 9, further comprising:
    receiving a second acknowledgment message from the second UE for the scheduled second downlink transmission during a second CCA-free acknowledgment period following the scheduled second downlink transmission.

11. The method of claim 8, wherein the extended CCA procedure comprises an omni-directional CCA procedure or a directional CCA procedure.

12. An apparatus for wireless communication at a network device, comprising:
    at least one processor;
    at least one memory coupled with the at least one processor; and
    instructions stored in the at least one memory and executable by the at least one processor to cause the apparatus to:
        transmit, to a user equipment (UE), a control message comprising a grant for a downlink transmission;
        perform, during a gap that extends from an end of the control message to a beginning of the downlink transmission, a clear channel assessment (CCA) procedure that fully occupies the gap on a shared radio frequency spectrum band associated with the downlink transmission; and
        perform, in accordance with a success of the CCA procedure, the downlink transmission to the UE over the shared radio frequency spectrum band.

13. The apparatus of claim 12, wherein the instructions are further executable by the at least one processor to cause the apparatus to:

receive an acknowledgment message for the downlink transmission during a CCA-free acknowledgment period following the downlink transmission.

14. The apparatus of claim 12, wherein the instructions are further executable by the at least one processor to cause the apparatus to:
perform, before transmitting the control message, a one-shot CCA procedure on the shared radio frequency spectrum band in accordance with the downlink transmission.

15. The apparatus of claim 12, wherein the CCA procedure comprises at least one of an omni-directional CCA procedure or a directional CCA procedure.

16. The apparatus of claim 12, wherein the CCA procedure comprises at least one of an extended CCA procedure or a one-shot CCA procedure.

17. The apparatus of claim 12, wherein the CCA procedure comprises a category 2 listen-before-talk (LBT) procedure.

18. The apparatus of claim 12, wherein the instructions are further executable by the at least one processor to cause the apparatus to:
perform the CCA procedure and the downlink transmission at a boundary of a slot.

19. An apparatus for wireless communication at a network device, comprising:
at least one processor;
instructions stored in at least one memory and executable by the at least one processor to cause the apparatus to:
perform an extended clear channel assessment (CCA) procedure to obtain access to a shared radio frequency spectrum band for a downlink transmission opportunity;
perform, in accordance with a result of the extended CCA procedure, a first downlink transmission to a first UE over the shared radio frequency spectrum band, the first downlink transmission including a first downlink control channel and a first downlink data channel for the first UE;
perform a one-shot CCA procedure on the shared radio frequency spectrum band in accordance with a scheduled second downlink transmission to a second UE within the downlink transmission opportunity; and
perform, in accordance with a result of the one-shot CCA procedure, the scheduled second downlink transmission to the second UE over the shared radio frequency spectrum band, the scheduled second downlink transmission including a second downlink control channel and a second downlink data channel for the second UE.

20. The apparatus of claim 19, wherein the instructions are further executable by the at least one processor to cause the apparatus to:
receive a first acknowledgment message from the first UE for the first downlink transmission during a first CCA-free acknowledgment period following the first downlink transmission.

21. The apparatus of claim 20, wherein the instructions are further executable by the at least one processor to cause the apparatus to:
receive a second acknowledgment message from the second UE for the scheduled second downlink transmission during a second CCA-free acknowledgment period following the scheduled second downlink transmission.

22. The apparatus of claim 19, wherein the extended CCA procedure comprises an omni-directional CCA procedure or a directional CCA procedure.

\* \* \* \* \*